United States Patent
Metsch et al.

(10) Patent No.: US 12,299,113 B2
(45) Date of Patent: May 13, 2025

(54) INTENT-BASED ORCHESTRATION IN HETEROGENOUS COMPUTE PLATFORMS

(71) Applicant: Intel Corporation, Santa Clara, CA (US)

(72) Inventors: Thijs Metsch, Bruehl (DE); Susanne M. Balle, Hudson, NH (US); Patrick Koeberl, Portland, OR (US); Bin Li, Portland, OR (US); Mark Yarvis, Portland, OR (US); Adrian Hoban, Cratloe (IE); Kshitij Arun Doshi, Tempe, AZ (US); Francesc Guim Bernat, Barcelona (ES); Cesar Martinez-Spessot, Hillsboro, OR (US); Mats Gustav Agerstam, Portland, OR (US); Dario Nicolas Oliver, Hillsboro, OR (US); Marcos E. Carranza, Portland, OR (US); John J. Browne, Limerick (IE); Mikko Ylinen, Lempaala (FI); David Cremins, Toomaline (IE)

(73) Assignee: Intel Corporation, Santa Clara, CA (US)

( * ) Notice: Subject to any disclaimer, the term of this patent is extended or adjusted under 35 U.S.C. 154(b) by 629 days.

(21) Appl. No.: 17/561,061

(22) Filed: Dec. 23, 2021

(65) Prior Publication Data

US 2022/0124009 A1    Apr. 21, 2022

Related U.S. Application Data

(60) Provisional application No. 63/280,001, filed on Nov. 16, 2021.

(51) Int. Cl.
G06F 21/51 (2013.01)
G06F 1/3228 (2019.01)
(Continued)

(52) U.S. Cl.
CPC ............ *G06F 21/51* (2013.01); *G06F 1/3228* (2013.01); *G06F 1/3296* (2013.01);
(Continued)

(58) Field of Classification Search
CPC ...... G06F 21/51; G06F 1/3228; G06F 1/3296; G06F 9/3875; G06F 9/44505;
(Continued)

(56) References Cited

U.S. PATENT DOCUMENTS 9,940,125 B1     4/2018  Espy et al.
2021/0120029 A1*  4/2021  Ross ..................... G06F 21/577
(Continued)

FOREIGN PATENT DOCUMENTS

NL       2033285      12/2023
WO    2020263374      12/2020

OTHER PUBLICATIONS

"Netherlands Application Serial No. 2033285, Office Action mailed Oct. 28, 2022", w English machine translation, 4 pgs.
(Continued)

*Primary Examiner* — Jude Jean Gilles
(74) *Attorney, Agent, or Firm* — Schwegman Lundberg & Woessner, P.A.

(57) ABSTRACT

Various systems and methods for implementing intent-based orchestration in heterogenous compute platforms are described herein. An orchestration system is configured to: receive, at the orchestration system, a workload request for a workload, the workload request including an intent-based service level objective (SLO); generate rules for resource allocation based on the workload request; generate a deployment plan using the rules for resource allocation and the intent-based SLO; deploy the workload using the deployment plan; monitor performance of the workload using real-time telemetry; and modify the rules for resource allo-
(Continued)

cation and the deployment plan based on the real-time telemetry.

25 Claims, 18 Drawing Sheets

(51) Int. Cl.
| | |
|---|---|
| G06F 1/3296 | (2019.01) |
| G06F 9/38 | (2018.01) |
| G06F 9/445 | (2018.01) |
| G06F 9/50 | (2006.01) |
| G06F 21/57 | (2013.01) |
| G06N 20/00 | (2019.01) |
| G06Q 10/087 | (2023.01) |
| H04L 9/40 | (2022.01) |
| H04L 41/5003 | (2022.01) |
| H04L 41/5009 | (2022.01) |
| H04L 41/5019 | (2022.01) |
| H04L 41/5025 | (2022.01) |
| H04L 41/5054 | (2022.01) |
| H04L 43/08 | (2022.01) |
| H04L 43/0823 | (2022.01) |
| H04L 47/70 | (2022.01) |
| H04L 47/72 | (2022.01) |
| H04L 67/1097 | (2022.01) |
| H04L 67/146 | (2022.01) |
| H04L 67/52 | (2022.01) |

(52) U.S. Cl.
CPC ........ *G06F 9/3875* (2013.01); *G06F 9/44505* (2013.01); *G06F 9/5027* (2013.01); *G06F 21/577* (2013.01); *G06N 20/00* (2019.01); *G06Q 10/087* (2013.01); *H04L 41/5003* (2013.01); *H04L 41/5009* (2013.01); *H04L 41/5019* (2013.01); *H04L 41/5025* (2013.01); *H04L 41/5054* (2013.01); *H04L 43/08* (2013.01); *H04L 43/0823* (2013.01); *H04L 47/72* (2013.01); *H04L 47/821* (2013.01); *H04L 47/822* (2013.01); *H04L 63/083* (2013.01); *H04L 67/1097* (2013.01); *H04L 67/146* (2013.01); *H04L 67/52* (2022.05); *G06F 2209/503* (2013.01); *G06F 2221/033* (2013.01); *G06F 2221/2135* (2013.01)

(58) Field of Classification Search
CPC ................ G06F 9/5027; G06F 21/577; G06F 2209/503; G06F 2221/033; G06F 2221/2135; G06N 20/00; H04L 67/52; H04L 41/5003; H04L 41/5009; H04L 41/5019; H04L 41/5025; H04L 41/5054; H04L 43/08; H04L 43/0823; H04L 47/72; H04L 47/821; H04L 47/822; H04L 63/083; H04L 67/1097; H04L 67/146; G06Q 10/087
USPC .......................................... 709/226
See application file for complete search history.

(56) References Cited

U.S. PATENT DOCUMENTS

2021/0168150 A1* 6/2021 Ross .................. G06F 16/9024
2021/0328886 A1 10/2021 Guim Bernat et al.

OTHER PUBLICATIONS

"Netherlands Application Serial No. 2033285, Office Action mailed Oct. 5, 2023", W English Machine Translation, 31 pgs.

* cited by examiner

INTENT-BASED ORCHESTRATION IN HETEROGENOUS COMPUTE PLATFORMS

PRIORITY CLAIM

This application claims priority to U.S. Provisional Patent Application No. 63/280,001, filed Nov. 16, 2021, which is incorporated herein by reference in its entirety.

TECHNICAL FIELD

Embodiments described herein generally relate to network monitoring and tuning and in particular, to a system and method for implementing intent-based orchestration in heterogenous compute platforms.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced several advanced use cases and scenarios occurring at and towards the edge of the network. However, these advanced use cases have also introduced several corresponding technical challenges relating to orchestration, security, processing and network resources, service availability and efficiency, ensuring quality of service, among many other issues, especially as more types of computing systems and configurations are deployed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
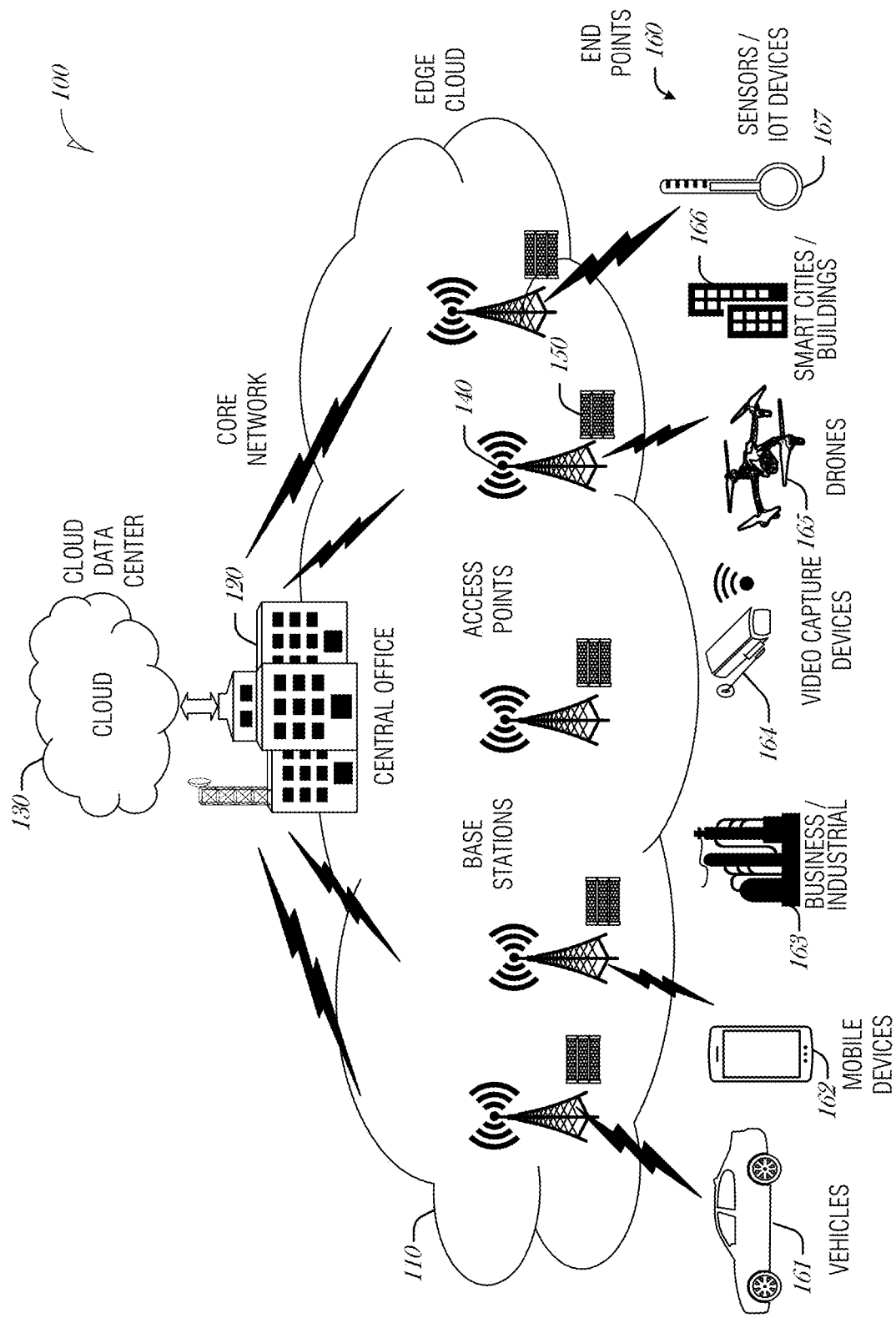
FIG. 1 illustrates an overview of an Edge cloud configuration for Edge computing, according to an embodiment.

Systems and methods described herein provide for intent-based orchestration in heterogenous compute platforms. Current orchestration solutions use a very imperative way to achieving quality of service (QoS) management. QoS management is mostly built around requesting the correct quantity of resources (e.g., number of virtual central processing units (vCPUs)), or hardware features to support the workloads at the cloud and edge. Performing orchestration this way has several issues. It creates unwanted vendor-lock in, as specific feature sets specified by one vendor may not be available by equipment provided by another vendor. Further, experience shows that incorrect information is declared in the QoS request and hence leads to sub-optimal performance Finally, these declarations have context that are not included in the QoS management scheme. For instance, the type of platform the application is running on (e.g., Xeon type core vs Atom-based core processors) may affect the provisioning decisions to satisfy a certain QoS request.

Furthermore, as the workload is moving from a monolithic style to a microservices style, it becomes harder for customers to select the correct resource allocations for the workloads by themselves. This may lead to the customers overprovisioning the resources, which results in higher cost.

It is important that as hardware platforms become more heterogenous (e.g., using multiple XPUs instead of a single CPU), the user should be abstracted from needing to define the multitude of contextual details in an orchestration request, and instead be able to focus on what it wants to achieve a certain set of objectives for the services at play. An intent-driven model provides this abstraction for the user and results in good performance for the service owner as well as good return on investment for the resource owner. Thus, what is needed is a way to map intents (defined as service level objectives) across a set of systems and their resources to achieve required levels of quality of service.

A service level agreement (SLA) is an agreement between a service provider and a client. SLAs are contracts between third parties that outline service targets or other business objectives. SLAs may outline penalties for parties who fail to satisfy a target. For example, a partial refund of fees may be enforced when a service is unavailable for more than some threshold percentage over a 90 day period.

Service level objectives (SLOs) provide precise numerical targets for various system capabilities. Typical SLOs are oriented around service availability or uptime, service latency, service bandwidth provisioning, etc. SLOs are often expressed as percentages, such as requiring "99.9% uptime over a 30-day period," or "Response time of less than 100 ms on at least 95% of the requests received."

Key performance indicators (KPIs) are quantifiable measures of performance over time for a specific objective. KPI metrics are collected to measure SLO policies. Example KPIs include, but are not limited to a number of service errors, downtime, cache misses, frames per second (FPS), latency, instructions per cycle (IPC), security faults, failed logins, etc. KPIs may be derived values (e.g., average latency over a moving 30 second window). KPIs may also be based on comparisons (e.g., percent different from historical average).

Service quality objectives may be captured as statistical and deterministic specifications that form a layered, top-down structure, but not constrained to be in a tree or DAG pattern. For example, a meta-language may be used to express key performance indicators (KPIs) and how they are combined to evaluate an overall quality of service (QoS) or Service Level Objective (SLO). Various ranges, comparisons, thresholds, constraints, or the like, on the KPIs may be expressed using a meta-language. Most real-world software solutions have to satisfy many intricate demands for performance, scale, accuracy and availability, and these demands are not necessarily fixed for all time or for all situations. Just as programs in a language like C or Python permit a programmer a high degree of flexibility in expressing what is to be computed, a meta-language may be used that expresses the dynamic requirements that need to be met by schedulers of resources. A meta-program written in such a meta-language may introduce variables that, for example, reflect various calibrations that are performed on the behaviors of programs, runtimes, operating systems, infrastructural services, networking gear, and so on. These variables are then woven into higher level variables and results of the meta-programs, and in turn drive corrective, reactive, alertive, and other actions from meta-programs. The structuring is layered so that meta-programs are designed for abstraction and reduction of detail and for convergence to the specified objectives at higher levels.

An open architecture is provided so that the layering of policies, heuristics, etc., is not confined by rules of logic alone, but permits the ability to plug-in data-programmed intelligences such as neural networks, support vector machines (SVMs), decision trees, etc. The overall goal is to redirect a portion of computing to such meta-programs and avoid making a strict division between the computations that are part of an application's structure and the computations that are designed to meet a service quality objective during the execution of the application. Thus, the ordinary distinction between a control/administrative plane like Kubernetes and a containerized application under which it runs is blurred, and information about the intent and the performance to that intent is allowed to flow bidirectionally at different layers of depth. Accordingly, auto-corrective and auto-indicative capabilities can be co-engineered between the flows in service-objectives and service-quality-objectives. A benefit is that software begins to achieve self-adaptive or co-adaptive accommodation with the environments in which it is activated.

Statistical admission control policies that attempt to maximize Service Level Agreements (SLA) satisfaction are available and are related to jitter-sensitive network systems. However, as abstraction moves upward and scheduling in serverless systems or highly virtualized is implemented and just-in-time assignments of resources through containers created on demand, the complexity of scheduling resources continues to increase. Very large data centers can provision significant amounts of capacity to perform reactive load-balancing and can defer admission denials to all but the most extreme bursts of demand, but smaller, and less elastic providers of infrastructure have to make tough calls even under statistical policies because when a cutoff is for an outlier tail latency. It is extremely difficult to honor large bursts in demand that can cause a cascade of latency pushouts. As an alternative, the systems and methods described herein implement SLAs that are both nested and graduated and are thus burst-accommodative.

Imagine a token-bucket model with a single queue at a rate limited server: a statistical projection for the newest arrival has a mean response time that is proportional to the queue length seen by the new arrival. A naïve policy would be to reject the new arrival if this projected response time violates a tail latency constraint; a slightly less naïve policy would be to reject the new arrival probabilistically, depending on the queue length and the number of violations that have already occurred. Now imagine a generalization in which the baseline single queue, single rate server is split into a two-level policy in which the newest arrival is placed in the second queue where it is guaranteed a lower service rate but permitted a more relaxed tail latency. Thus, for example, if the first queue had a P99 latency of 10 ms, the second queue may have a combination SLO with a P95 latency of 10 ms and a P99 latency of 20 ms. Because extreme bursts are rare, the fractional capacity devoted to the second queue need not be high, because its average queue length is small. In a data center, the movement to a second queue is effectively reassigning the marginal request (the one that is likely to violate a stringent latency bound), to a less utilized but less resourced overflow cluster with correspondingly more relaxed SLO. This scheme can be generalized so that as the second queue approaches its saturation for response time, a third queue with even more liberal SLO absorbs the overflow. In this way, a compound nested SLOs within an SLA can be crafted that is adaptive to bursts. The provider can negotiate a similarly graduated cost model in which the savings from not having to provision a lot of peak capacity to meet an inelastic SLA are passed back to customers who accept a nested SLA.

As opposed to Hierarchical Service Level Agreements, the systems and methods described here introduce SLAs that are both nested and graduated. Instead of relying on classic thresholding, and instead of having hard set "single" clause rules to check, a nested sub-clause of the SLA can be evaluated in combination with other sub-clauses to evaluate the overall SLA. This allows more complex rules. Also, "parsing" of the sub-clauses allows results of each clause to create sharing of unused resources. This approach allows more flexibility in the SLA rules and better use of cluster resources. The flexibility can be introduced as an "intent" not a resource specification, which then is mapped to nested/graduated SLA rules which are then monitored and enforced.

In production deployments a common pattern is to deploy new instances of an application on a portion of the environment and test with a small subset of the user base before rolling out to the wider population (i.e., Canary roll-out). Acknowledging that the SLA mapping to lower and lower levels of Service Level Objectives requires an iterative approach (for both optimization and remediation purposes), the new workflow for this SLA decomposition also includes the potential to partially deploy in either a limited end-to-end fashion or as sub-components of the E2E solution to determine impact on SLA adherence.

In summary, the systems and methods described herein provide a new way to achieve orchestration, moving from a current model to an objective driven approach, in which the customer expresses only the intent (e.g., latency, throughput, and reliability properties) and the orchestration stack itself sets up the platform to achieve that intent. As serverless infrastructure becomes more common, cloud-native (microservice) style workloads will eventually demand a way of intent driven orchestration. These functions and others are described in more detail below.

FIG. 1 is a block diagram 100 showing an overview of a configuration for Edge computing, which includes a layer of processing referred to in many of the following examples as an "Edge cloud". As shown, the Edge cloud 110 is colocated at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
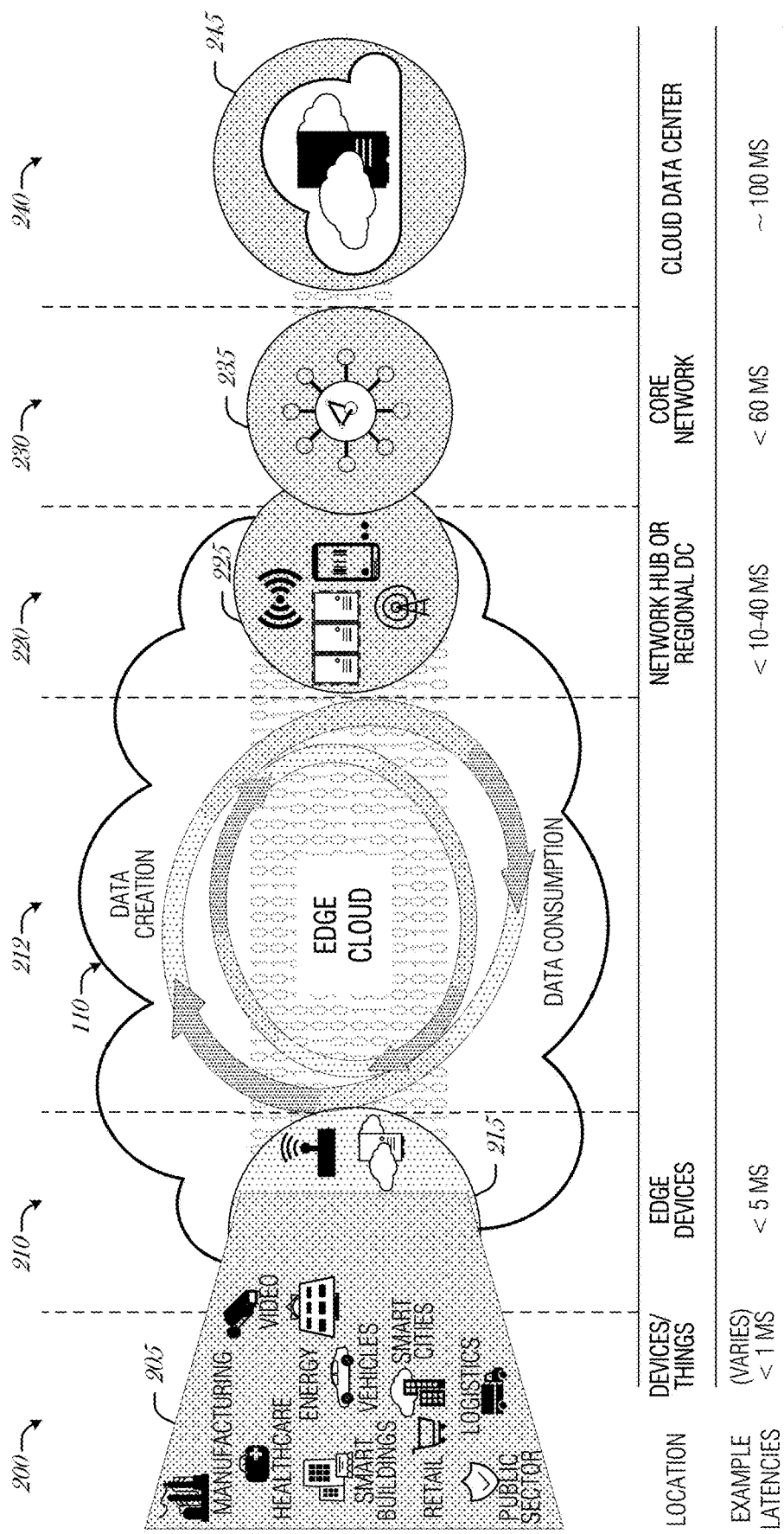
FIG. 2 illustrates operational layers among endpoints, an Edge cloud, and cloud computing environments, according to an embodiment.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs.

Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6B. The Edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
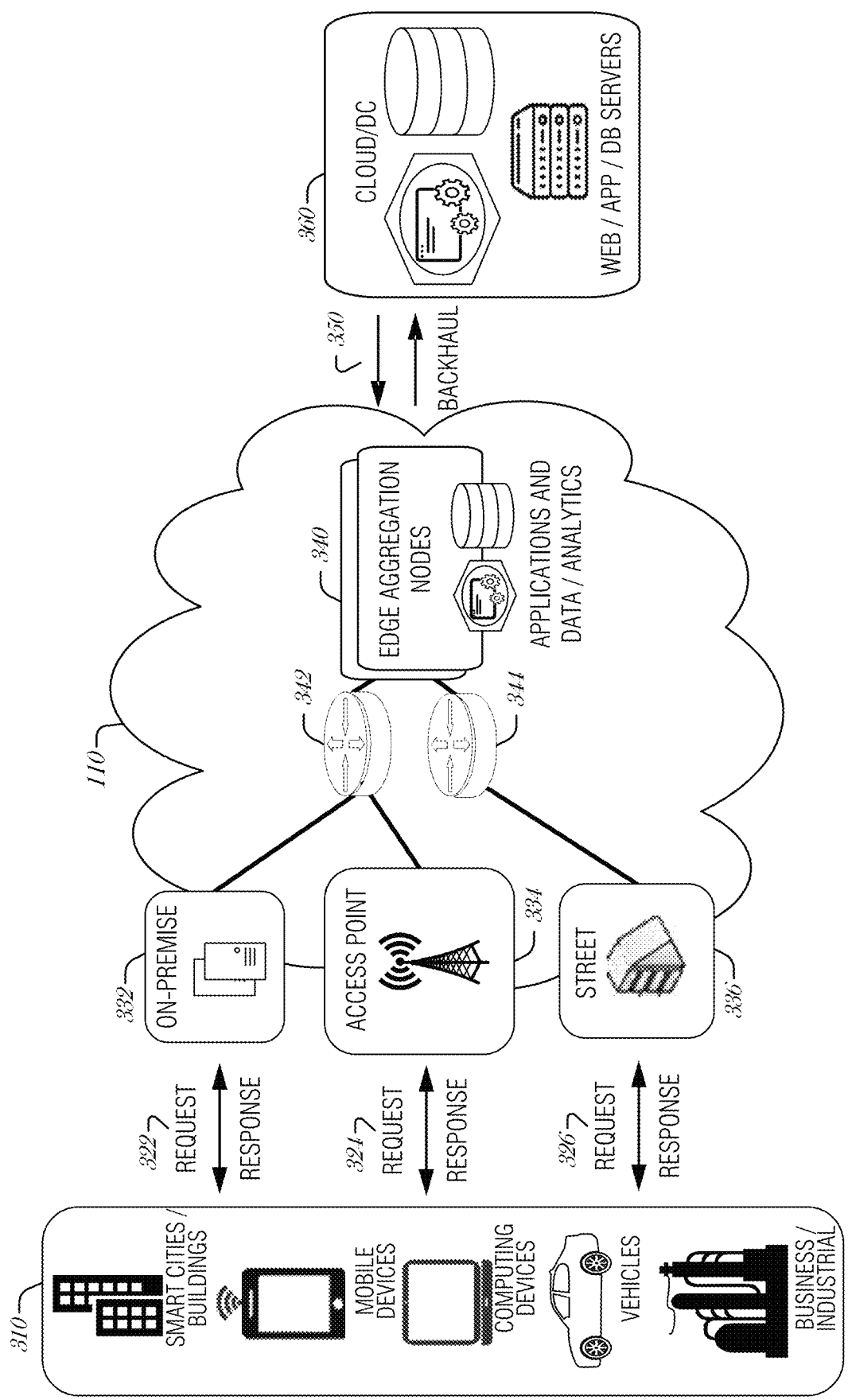
FIG. 3 illustrates an example approach for networking and services in an Edge computing system, according to an embodiment.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
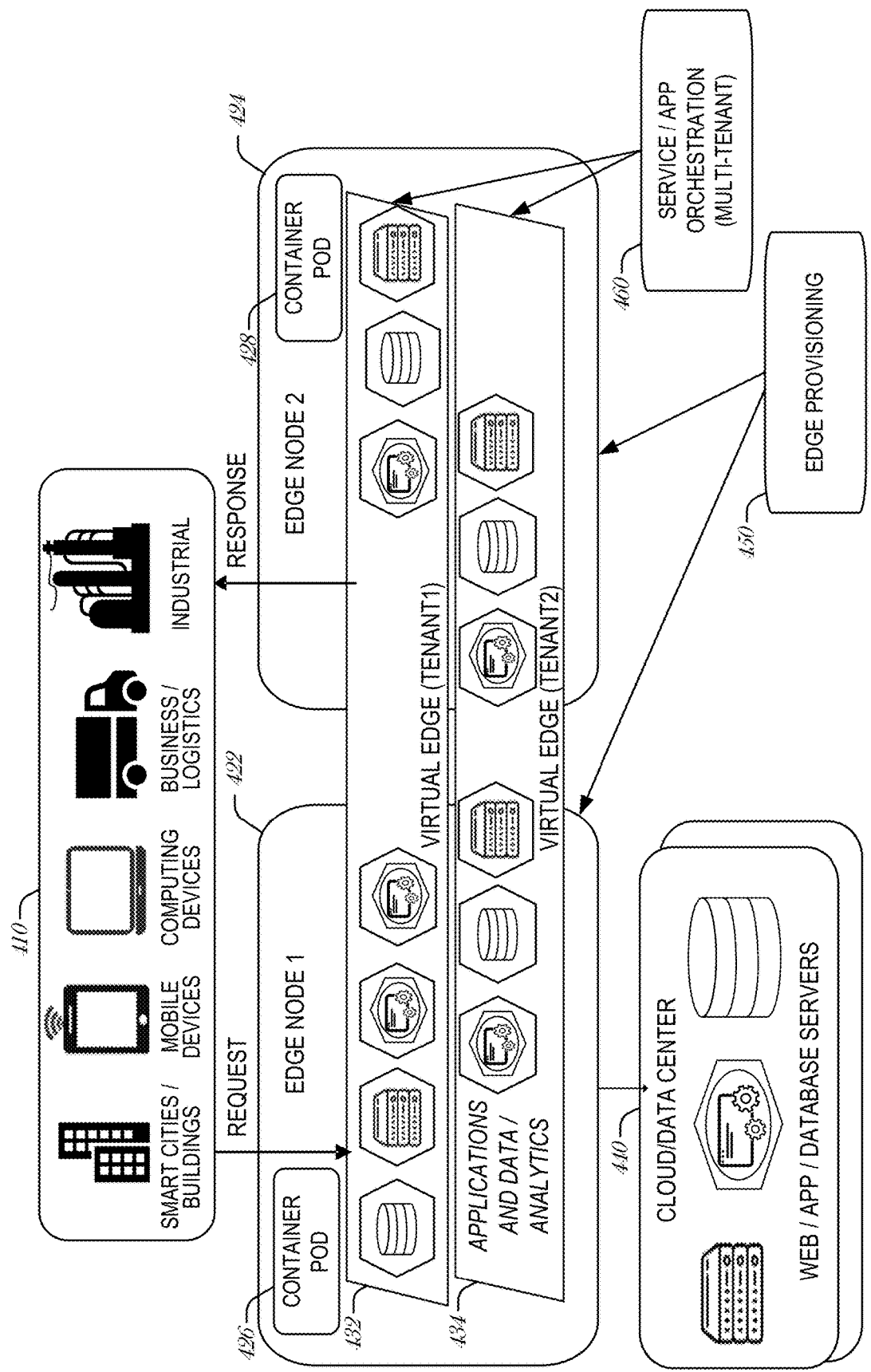
FIG. 4 illustrates deployment of a virtual Edge configuration in an Edge computing system operated among multiple Edge nodes and multiple tenants, according to an embodiment.

FIG. 4 illustrates deployment and orchestration for virtualized and container-based Edge configurations across an Edge computing system operated among multiple Edge nodes and multiple tenants (e.g., users, providers) which use such Edge nodes. Specifically, FIG. 4 depicts coordination of a first Edge node 422 and a second Edge node 424 in an Edge computing system 400, to fulfill requests and responses for various client endpoints 410 (e.g., smart cities/building systems, mobile devices, computing devices, business/logistics systems, industrial systems, etc.), which access various virtual Edge instances. Here, the virtual Edge instances 432, 434 provide Edge compute capabilities and processing in an Edge cloud, with access to a cloud/data center 440 for higher-latency requests for websites, applications, database servers, etc. However, the Edge cloud enables coordination of processing among multiple Edge nodes for multiple tenants or entities.

In the example of FIG. 4, these virtual Edge instances include: a first virtual Edge 432, offered to a first tenant (Tenant 1), which offers a first combination of Edge storage, computing, and services; and a second virtual Edge 434, offering a second combination of Edge storage, computing, and services. The virtual Edge instances 432, 434 are distributed among the Edge nodes 422, 424, and may include scenarios in which a request and response are fulfilled from the same or different Edge nodes. The configuration of the Edge nodes 422, 424 to operate in a distributed yet coordinated fashion occurs based on Edge provisioning functions 450. The functionality of the Edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective Edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual Edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous Edge node. As part of migration of a container, a pod controller at a source Edge node may obtain a migration key from a target Edge node pod controller where the migration key is used to wrap the container-specific keys. When the container/pod is migrated to the target Edge node, the unwrapping key is exposed to the pod controller that then decrypts the wrapped keys. The keys may now be used to perform operations on container specific data. The migration functions may be gated by properly attested Edge nodes and pod managers (as described above).

In further examples, an Edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an Edge computing system may be configured to fulfill requests and responses for various client endpoints from multiple virtual Edge instances (and, from a cloud or remote data center). The use of these virtual Edge instances may support multiple tenants and multiple applications (e.g., augmented reality (AR)/virtual reality (VR), enterprise applications, content delivery, gaming, compute offload) simultaneously. Further, there may be multiple types of applications within the virtual Edge instances (e.g., normal applications; latency sensitive applications; latency-critical applications; user plane applications; networking applications; etc.). The virtual Edge instances may also be spanned across systems of multiple owners at different geographic locations (or, respective computing systems and resources which are co-owned or co-managed by multiple owners).

For instance, each Edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various Edge node resources (e.g., storage, compute, services, depicted with hexagons) provided for the respective Edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different Edge node that does satisfy it. Alternatively, the first pod may be allowed to execute and a different shared pod controller is installed and invoked prior to the second pod executing.

Figure 5:
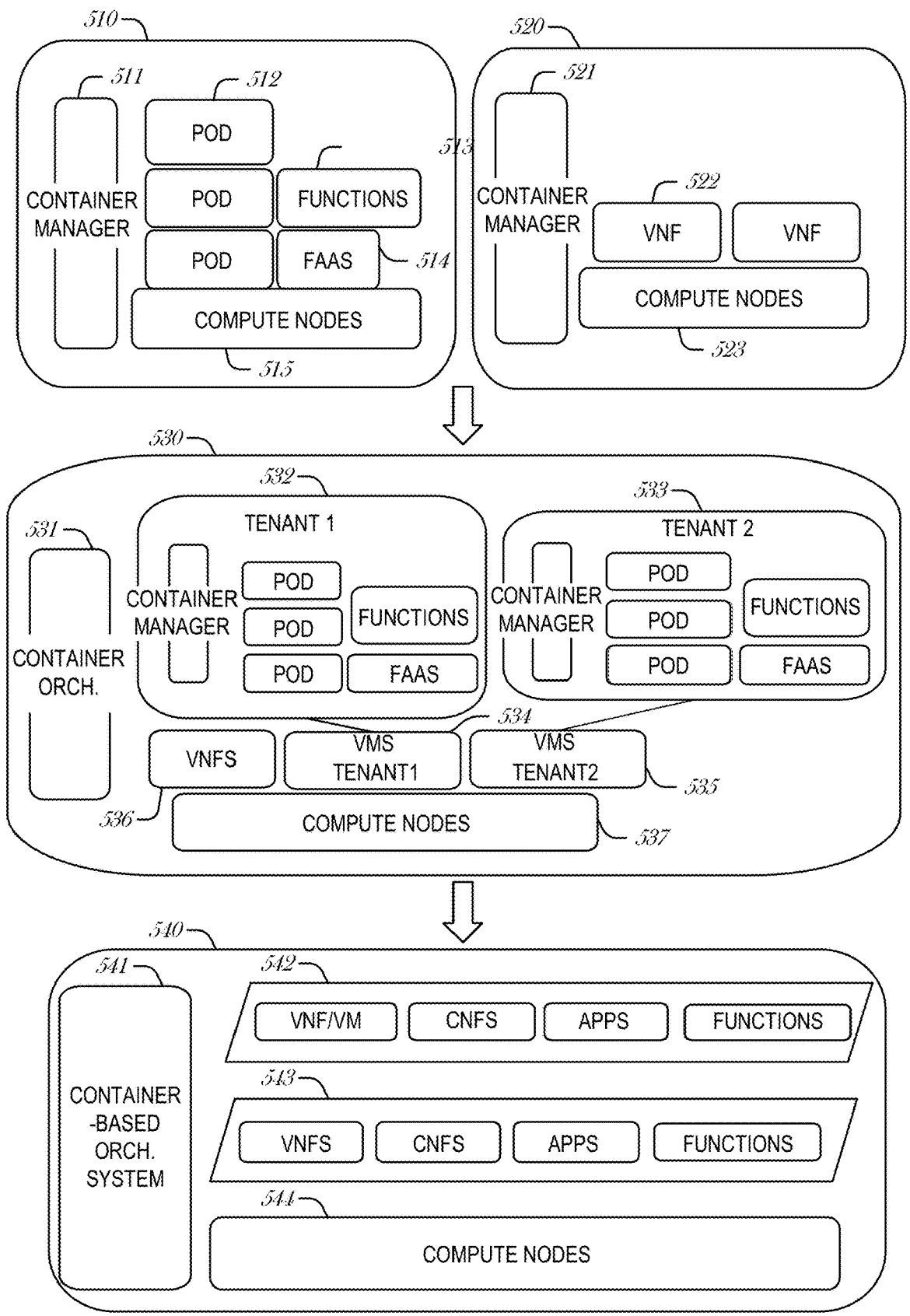
FIG. 5 illustrates various compute arrangements deploying containers in an Edge computing system, according to an embodiment.

FIG. 5 illustrates additional compute arrangements deploying containers in an Edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple Edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but Edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an Edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present Edge computing systems and environment may be fulfilled based on the components depicted in FIGS. 6A and 6B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 6A:
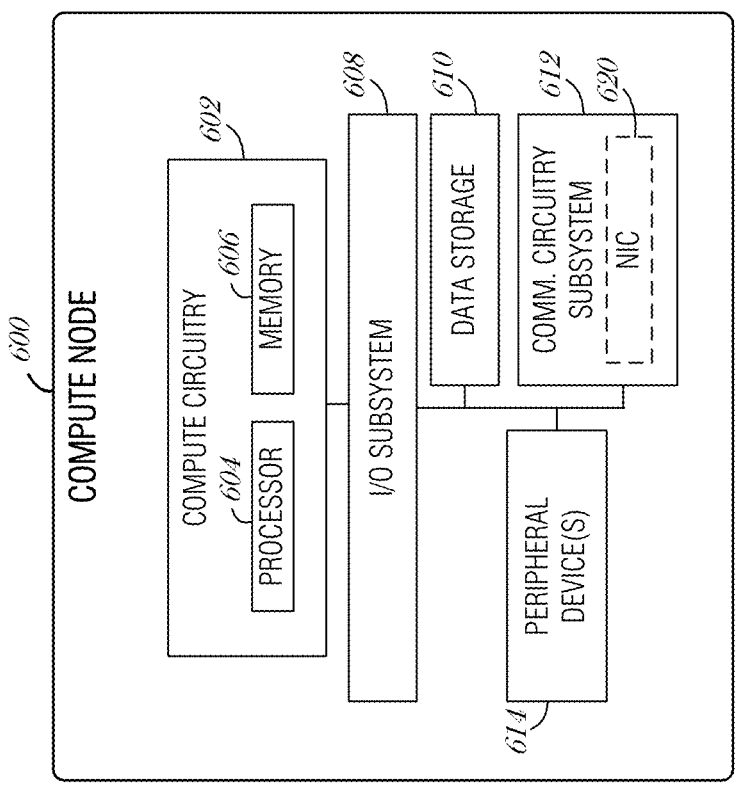
FIG. 6A provides an overview of example components for compute deployed at a compute node in an Edge computing system, according to an embodiment.

In the simplified example depicted in FIG. 6A, an Edge compute node 600 includes a compute engine (also referred to herein as "compute circuitry") 602, an input/output (I/O) subsystem (also referred to herein as "I/O circuitry") 608, data storage (also referred to herein as "data storage circuitry") 610, a communication circuitry subsystem 612, and, optionally, one or more peripheral devices (also referred to herein as "peripheral device circuitry") 614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor (also referred to herein as "processor circuitry") 604 and a memory (also referred to herein as "memory circuitry") 606. The processor 604 may be embodied as any type of processor(s) capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 604 may be embodied as a specialized x-processing unit (x-PU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an x-PU may be designed to receive, retrieve and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an x-PU, a SOC, a CPU, and other variations of the processor 604 may work in coordination with each other to execute many types of operations and instructions within and on behalf of the compute node 600.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-ona-chip (SoC) and be incorporated, along with one or more of the processor 604, the memory 606, and other components of the compute circuitry 602, into the compute circuitry 602.

The one or more illustrative data storage devices/disks 610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 610 may include a system partition that stores data and firmware code for the data storage device/disk 610. Individual data storage devices/disks 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an Edge gateway of an implementing Edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an Edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective Edge compute node (whether a client, gateway, or aggregation node) in an Edge computing system or like forms of appliances, computers, subsystems, circuitry, or other components.

Figure 6B:
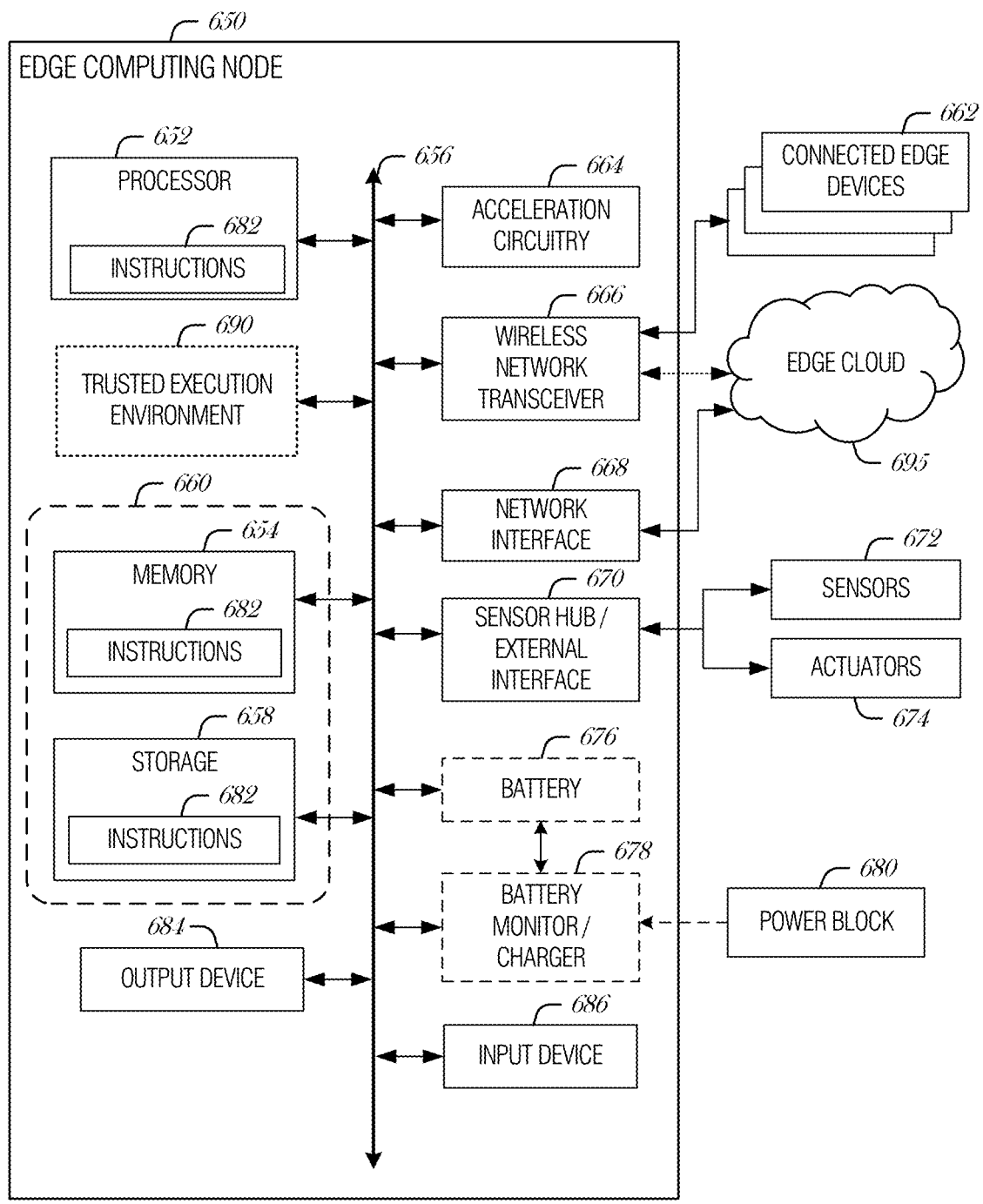
FIG. 6B provides a further overview of example components within a computing device in an Edge computing system, according to an embodiment.

In a more detailed example, FIG. 6B illustrates a block diagram of an example of components that may be present in an Edge computing node 650 for implementing the techniques (e.g., operations, processes, methods, and methodologies) described herein. This Edge computing node 650 provides a closer view of the respective components of node 600 when implemented as or as part of a computing device (e.g., as a mobile device, a base station, server, gateway, etc.). The Edge computing node 650 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 650, or as components otherwise incorporated within a chassis of a larger system.

The Edge computing device 650 may include processing circuitry in the form of a processor 652, which may be a microprocessor, a multi-core processor, a multithreaded processor, an ultra-low voltage processor, an embedded processor, an x-PU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected Edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the Edge computing node 650 may communicate with close devices, e.g., within about 10 meters, using a local transceiver based on Bluetooth Low Energy (BLE), or another low power radio, to save power. More distant connected Edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an Edge cloud 695) via local or wide area network protocols. The wireless network transceiver 666 may be a low-power wide-area (LPWA) transceiver that follows the IEEE 802.15.4, or IEEE 802.15.4g standards, among others. The Edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the Edge cloud 695 or to other devices, such as the connected Edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The Edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of x-PUs/DPUs/IPU/ NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the Edge computing node 650 to actuators 674, such as power switches, valve actuators, an audible sound generator, a visual warning device, and the like.

In some optional examples, various input/output (I/O) devices may be present within or connected to, the Edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 650. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 676 may power the Edge computing node 650, although, in examples in which the Edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the Edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC2990 from Linear Technologies, an ADT7488A from ON Semiconductor of Phoenix Arizona, or an IC from the UCD90xxx family from Texas Instruments of Dallas, TX. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the Edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the Edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the Edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

While the illustrated examples of FIG. 6A and FIG. 6B include example components for a compute node and a computing device, respectively, examples disclosed herein are not limited thereto. As used herein, a "computer" may include some or all of the example components of FIGS. 6A and/or 6B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 6A and/or 6B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 6A and/or 6B to satisfy functional objectives of distributed computing tasks. In some examples, the term "compute node" or "computer" only includes the example processor 604, memory 606 and I/O subsystem 608 of FIG. 6A. In some examples, one or more objective functions of a distributed computing task(s) rely on one or more alternate devices/structure located in different parts of an Edge networking environment, such as devices to accommodate data storage (e.g., the example data storage 610), input/output capabilities (e.g., the example peripheral device(s) 614), and/or network communication capabilities (e.g., the example NIC 620).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 6A and 6B, such computers satisfy execution of distributed computing objective functions without including computing structure that would otherwise be unused and/or underutilized. As such, the term "computer" as used herein includes any combination of structure of FIGS. 6A and/or 6B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 6A and 6B, computing devices include operating systems. As used herein, an "operating system" is software to control example computing devices, such as the example Edge compute node 600 of FIG. 6A and/or the example Edge compute node 650 of FIG. 6B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

The instructions 682 may further be transmitted or received over a communications network using a transmission medium via the wireless network transceiver 466 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5.875 GHz to 5.905 GHz), ITS-G5B (i.e., Operation in European ITS frequency bands dedicated to ITS non-safety applications in the frequency range 5.855 GHz to 5.875 GHz), ITS-G5C (i.e., Operation of ITS applications in the frequency range 5.470 GHz to 5.725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in the US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7085 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Figure 7:
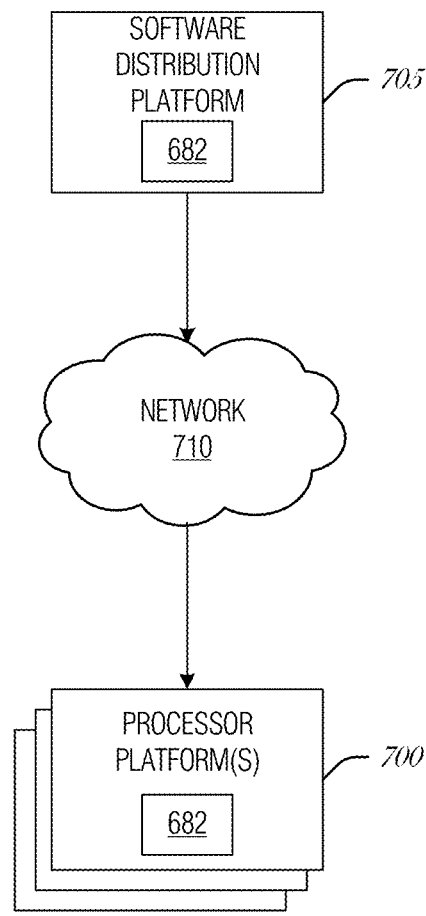
FIG. 7 illustrates an example software distribution platform to distribute software, such as the example computer readable instructions of FIG. 6B, to one or more devices, according to an embodiment.

FIG. 7 illustrates an example software distribution platform 705 to distribute software, such as the example computer readable instructions 682 of FIG. 6B, to one or more devices, such as example processor platform(s) 710 and/or example connected Edge devices. The example software distribution platform 705 may be implemented by any computer server, data facility, cloud service, etc., capable of storing and transmitting software to other computing devices (e.g., third parties, the example connected Edge devices). Example connected Edge devices may be customers, clients, managing devices (e.g., servers), third parties (e.g., customers of an entity owning and/or operating the software distribution platform 705). Example connected Edge devices may operate in commercial and/or home automation environments. In some examples, a third party is a developer, a seller, and/or a licensor of software such as the example computer readable instructions 682 of FIG. 6B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7, the software distribution platform 705 includes one or more servers and one or more storage devices. The storage devices store the computer readable instructions 682. The one or more servers of the example software distribution platform 705 are in communication with a network 715, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 682 from the software distribution platform 605. For example, the software, which may correspond to the example computer readable instructions, may be downloaded to the example processor platform(s) 700 (e.g., example connected Edge devices), which is/are to execute the computer readable instructions 682 to implement the content insertion at a switch. In some examples, one or more servers of the software distribution platform 705 are communicatively connected to one or more security domains and/or security devices through which requests and transmissions of the example computer readable instructions 682 must pass. In some examples, one or more servers of the software distribution platform 705 periodically offer, transmit, and/or force updates to the software (e.g., the example computer readable instructions 682 of FIG. 6B) to ensure improvements, patches, updates, etc. are distributed and applied to the software at the end user devices.

In the illustrated example of FIG. 7, the computer readable instructions 682 are stored on storage devices of the software distribution platform 705 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 682 stored in the software distribution platform 705 are in a first format when transmitted to the example processor platform(s) 710. In some examples, the first format is an executable binary in which particular types of the processor platform(s) 710 can execute. However, in some examples, the first format is uncompiled code that requires one or more preparation tasks to transform the first format to a second format to enable execution on the example processor platform(s) 710. For instance, the receiving processor platform(s) 710 may need to compile the computer readable instructions 682 in the first format to generate executable code in a second format that is capable of being executed on the processor platform(s) 710. In still other examples, the first format is interpreted code that, upon reaching the processor platform(s) 710, is interpreted by an interpreter to facilitate execution of instructions.

Figure 8:
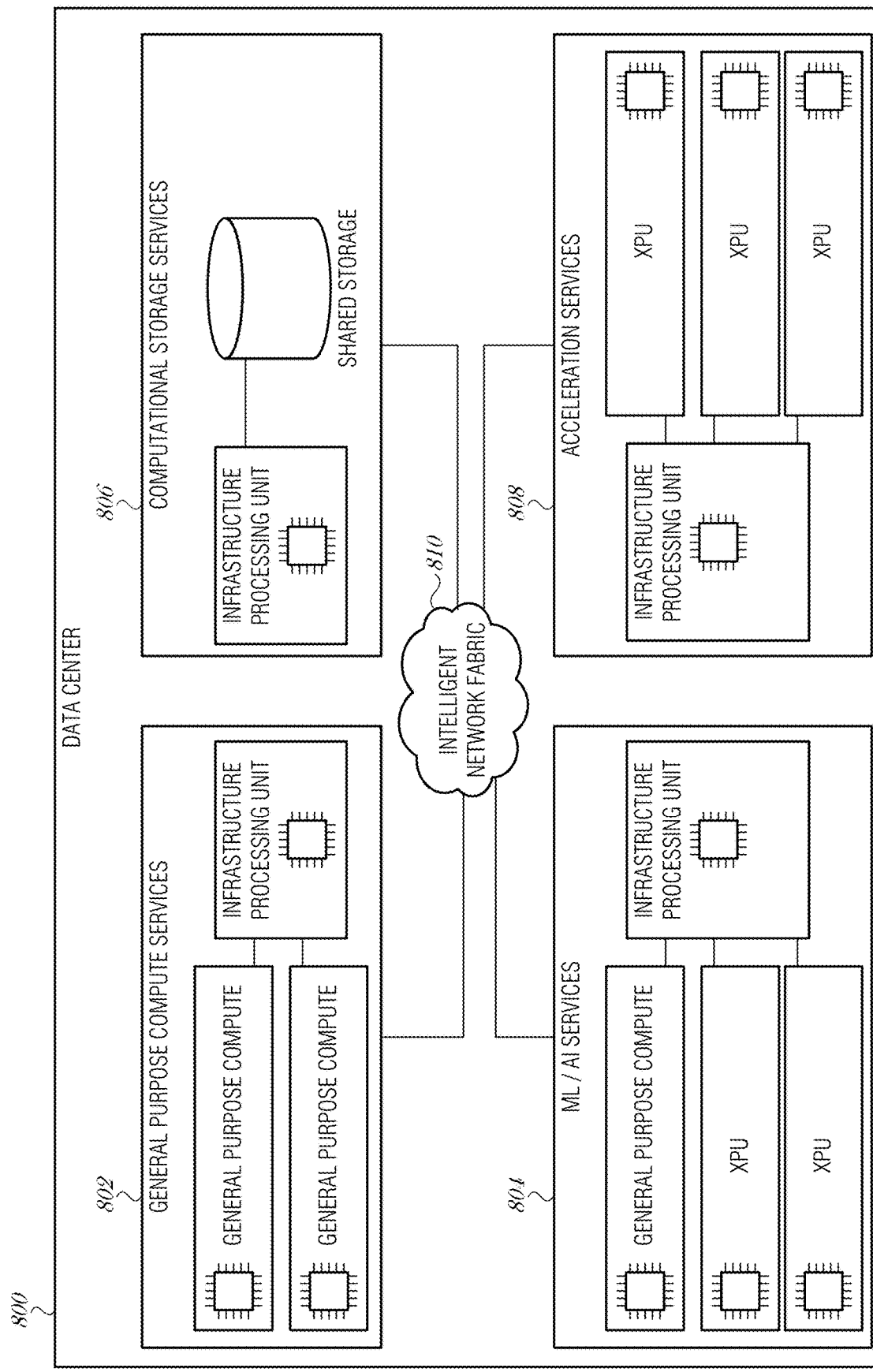
FIG. 8 is a block diagram illustrating a serverless data center, according to an embodiment.

FIG. 8 is a block diagram illustrating a serverless data center 800, according to an embodiment. The data center 800 is arranged into logical blocks of services. The service blocks illustrated in FIG. 8 include General Purpose Compute Services 802, Machine Learning (ML) and Artificial Intelligence (AI) Services 804, Computational Storage Services 806, and Acceleration Services 808. The service blocks are coupled with an intelligent network fabric 810.

With this type of serverless data center 800, a new way to perform orchestration may be achieved, which moves from current practices to an objective-driven approach where the customer expresses only the intent and the orchestration stack itself sets up the platform to achieve that intent.

Some existing Software as a Service (SaaS) models typically promote to their consumers a service-specific set of Service Level Objectives (SLO). For instance, a data analytics platform may promote a number of jobs per hour that can be computed. This is great from a user perspective, but still requires the SaaS provider to preemptively map SLOs to resources needed before sending requests to the resource orchestrator. The service providers are not able to automatically select resource types based on SLOs.

The systems and methods described herein illustrate how intents (objectives) may be mapped to platform settings automatically, dynamically, and directly. Intents are received as higher-level objectives and mapped throughout the orchestration stack to lower-level settings.

For example, consider an application requirement that there is certain percentage that something completes in a time window, referred to herein as "P50 Latency." Other terms may also be used, which may be similar, such as "P50 Target" or "P50 Completions" to indicate that tasks, projects, requests, or the like, need to complete on time at least 50% of the time, or that there is at least a 50% probability that the task will complete on time. This intent is mapped to lower-level settings, such as to indicate a thread-level priority and from there to a CPU cache way/profile assignment/resource allocation. On the input/output (I/O) side, the intent may be mapped to network settings to ensure sufficient communication resources are available to transmit and receive the request and response.

To dynamically adapt to changing conditions, the systems and methods use control loops at various levels in the architecture. The control loops may employ credit systems, utility/cost functions, planning and solvers, etc. The control loops may execute at different speeds depending on how quickly the monitored system needs to adapt. Such control loops are especially important and useful when considering the dynamicity of compute systems. For instance, network traffic may vary daily. If customers have to change the resource requirements themselves, then there is additional burden on them to use the service provider. Additionally, such changes may be difficult because the information needed to make such decisions may not be exposed to the customer. Instead, using the systems and methods described here, the customer need only to specify the intent and the system automatically adjusts the resources. This may lead to cost savings for both the customer and the service provider.

Dynamicity in the system also applies to the plans that are generated. These plans have a temporal element. For example, a plan may temporarily (e.g., on the order of minutes) target allocating an abundance of resources to a workload to catch up with an SLA under the supervision of a fast control loop and then over a longer period (e.g., monthly) look to achieve an acceptable and affordable resource allocation pattern with the supervision of a slower control loop. The plan can be either automatically triggered or be partially manually triggered, for instance by first sending the plan as a recommendation to a human operator to enable human-guidance.

Additionally, a plan's temporal aspect can also be useful from a continuous improvement point of view. A plan that satisfies all SLOs in the system-of-systems might be replaced by another plan which also satisfies all SLOs but triggers a different setup, configuration, or set of policies. For instance, to prepare for maintenance, an SLO may use resource more efficiently, make room for incoming workloads/services, or the like.

With a decentralized service-oriented platform, the complexity of orchestration increases even more. The systems and methods described here address orchestration across multiple sites that may be owned by different stakeholders. The individual parts may implement negotiation and coordination to achieve an overarching intent, which is paramount when there is no centralized orchestration.

In an implementation, a service provider may deploy a unit of computing (e.g., a pod) with application context meta-data so that the node can, in a fast control loop, make more appropriate application decisions and possibly choose not to deprioritize a low priority workload because of its end-to-end impacting nature. This requires an E2E view, however, and it include notions of co-scheduling and co-prioritization of nodes that must provide for security functions over data (including data provenance, compliance, and recording) with other computational nodes that perform operations in higher layers of the stack. In Kubernetes, a Pod is the smallest deployable unit of computing that you can create and manage A Pod is a group of one or more containers, with shared storage and network resources, and a specification for how to run the containers. A pod's contents are always colocated and co-scheduled, and run in a shared context.

With the shift to intent-driven systems, the system focuses on shifting from the deployment function to whether resources could potentially be made available, and how to reconfigure the system to make them available. Resources may be of different types while being in the same category: e.g. high-performance processors (e.g., Intel® Xeon CPUs) versus several reduced-computation processors (e.g., Xeon-Ds), or a single large XPU versus several smaller XPUs. Furthermore, a resource itself may contain different types of sub-resources/components, for instance efficient and performant cores, etc.

In some implementations, the system addresses the challenge of administratively governing complex, distributed infrastructure by putting Service Level Objective oriented controls in the hands of cluster and infrastructure administrators and removing the burden of having to specify possibly erroneous low level configuration details. An Admin Policy Controller and an Admin Policy Translation module may be implemented in the orchestration architecture and a workflow to administer multiple tiers of intent driven admin policies may be used in the workload deployment workflow. A closed loop control of administrative policies, including how to achieve them with multiple iterations on imperative configurations, may be used. It can influence workload placement and re-placement in the face of changing policies or policy non-compliance.

The system may implement a new model for driving Kubernetes' life-cycle management (LCM) to reflect the needs of the application rather than the assumptions of the Kubernetes administrator. The application is deployed temporarily (to support fast start) and subsequently a new instance of Kubernetes is deployed with the cluster and node level policies that better reflects the needs of the application. The workload is subsequently moved to the new cluster.

Current methods of sharing joint resources like Cache Allocation Technology (CAT) and Memory Bandwidth Allocation (MBA), and power rely on the application's KPIs being monitored by a specific dynamic controller (e.g., Resource Management Daemon (RMD), Dynamic Resource Controller (DRC), Appqos, etc.) or using Telemetry Aware Scheduling to deal with exhaustion. Having a "resource request broker" integrated into orchestration can have a message-based system, independent of the application KPI (which is monitored by the application itself). The broker can have a local agent on the platform, since time is a factor in the share, and can make local decisions based on a cluster "share" policy. Individual pods can sign up for static contracts, "guaranteed resource contracts," equal share contracts, or dynamic (bidding) contracts. Competing requests are arbitrated by the local broker agent which can operate a bid/offer scheme, for instance, "I'm willing to give up resource X for resource Y for period N."

Security risks arise when components are distributed across several resources. In intent-based orchestration, and similar to QoS classes, the system may allow users to define how "sensitive" they are, or how much risk they are willing to accepts, to certain aspects of security or trust in the environment. The system may include a set of additional components to the orchestration control plane to monitor, analyze, and access risk as well as a component able to translate the assessment into a set of policies, resources allocations, etc.

Figure 9:
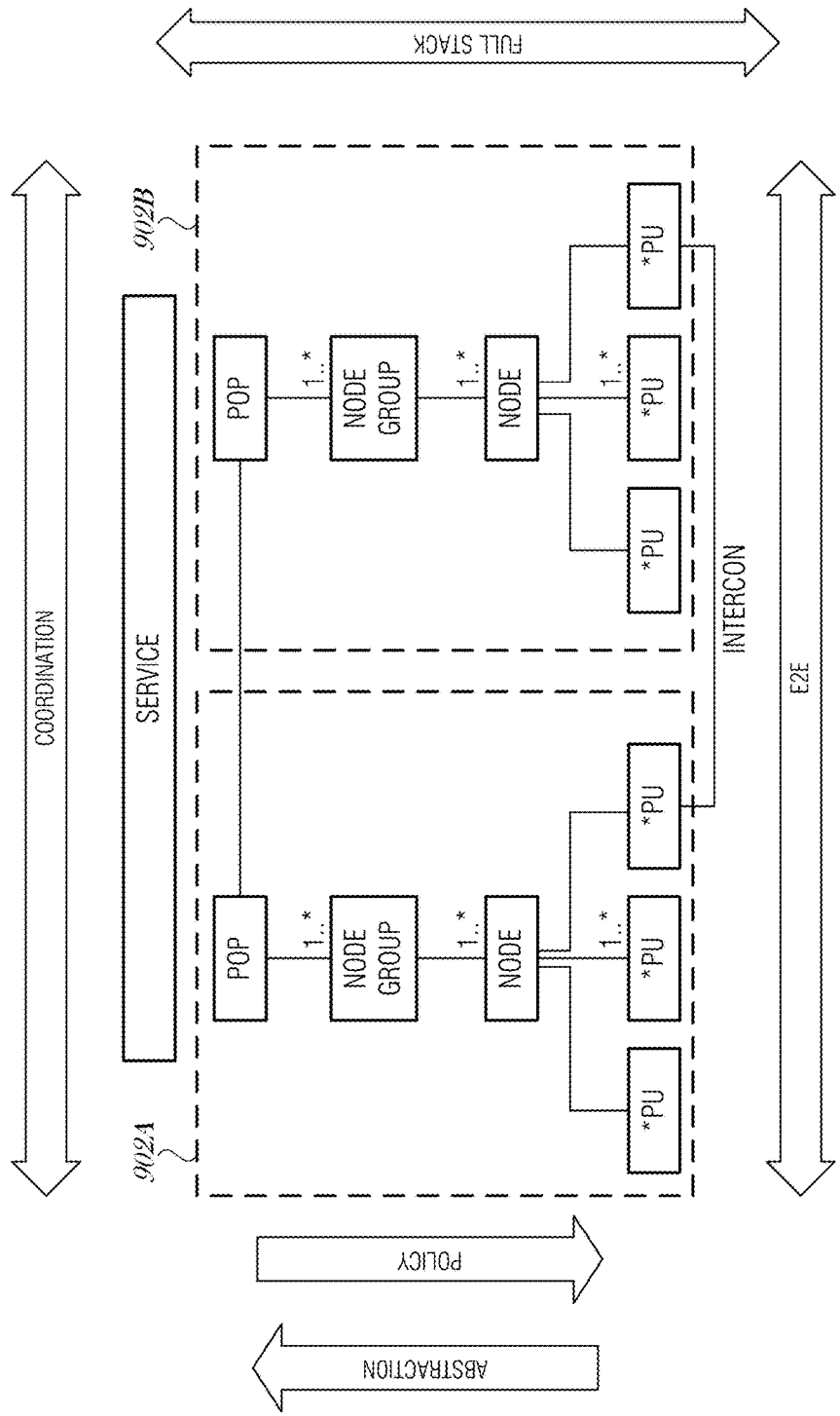
FIG. 9 is a block diagram illustrating an operating environment with multiple hardware systems and, according to an embodiment.

FIG. 9 is a block diagram illustrating an operating environment 900 with multiple hardware systems 902A and 902B, according to an embodiment. The operating environment 900 may be considered a "system of systems" that stretches north-south (e.g., the full stack) and east-west (e.g., E2E). At each layer in a system 902A or 902B, different kinds of intent may be mapped north-to-south or east-to-west to SLOs. SLOs at various layers in the stack may be described in frames per second (FPS), latency, instructions per cycle (IPC), etc. SLOs between enterprises or systems may be described in terms of how individual applications making up the service need to interact to achieve the overall intent goals. For instance, the E2E SLOs may include a P99 latency<100 ms requirement, frontend max 10 ms, backend 5 ms, caching max 10 ms, etc. To achieve the goals of full-stack SLOs and E2E SLOs, the system enforces policies from higher layers to lower layers, and coordinates or negotiates between components within a layer across systems.

SLOs, either full-stack or E2E (e.g., system to system) may be varied over time, be expressed with a range (e.g., a minimum and maximum allowable value), allow for deviance or variance outside of ranges for a certain period of time, be expressed as preferred or using other prioritization schemes, or the like. An example may be that the task must be P99 compliant 99% of the time for 60 minutes while not exceeding 10 ms and running at a preferred compliance level of 5 ms.

In some implementations, a set of sidecars associated with their workload are used on a node. The sidecars coordinate to make sure that the node, platform, facilities, etc. are setup correctly so the objectives of their workload can be met. The sidecars can monitor a particular setup and enforce the correct policies, allocating the correct resources, tuning settings so that the intents of the pods can be met, etc.

In some installations, there exists a challenge of placing charging/billing constraints on resource allocation decided upon by the orchestration system when presented with Service Level Objective based input parameters for a workload. Two new components enable Intent Driven Charging and Intent Driven Billing: 1) Charging Guardrails Function and 2) SLO Planning Function. The concept of a Charging Guardrails Function is introduced into the deployment workflow that is a logically central point in the orchestration architecture. It acts as the entity responsible for controlling and guiding the SLO oriented resource planning component to make sure the allocated resources are affordable for the user. The SLO Planning Function needs to consider the cost basis for allocated resources and not just their suitability for likely adherence to the workload SLA.

Figure 10:
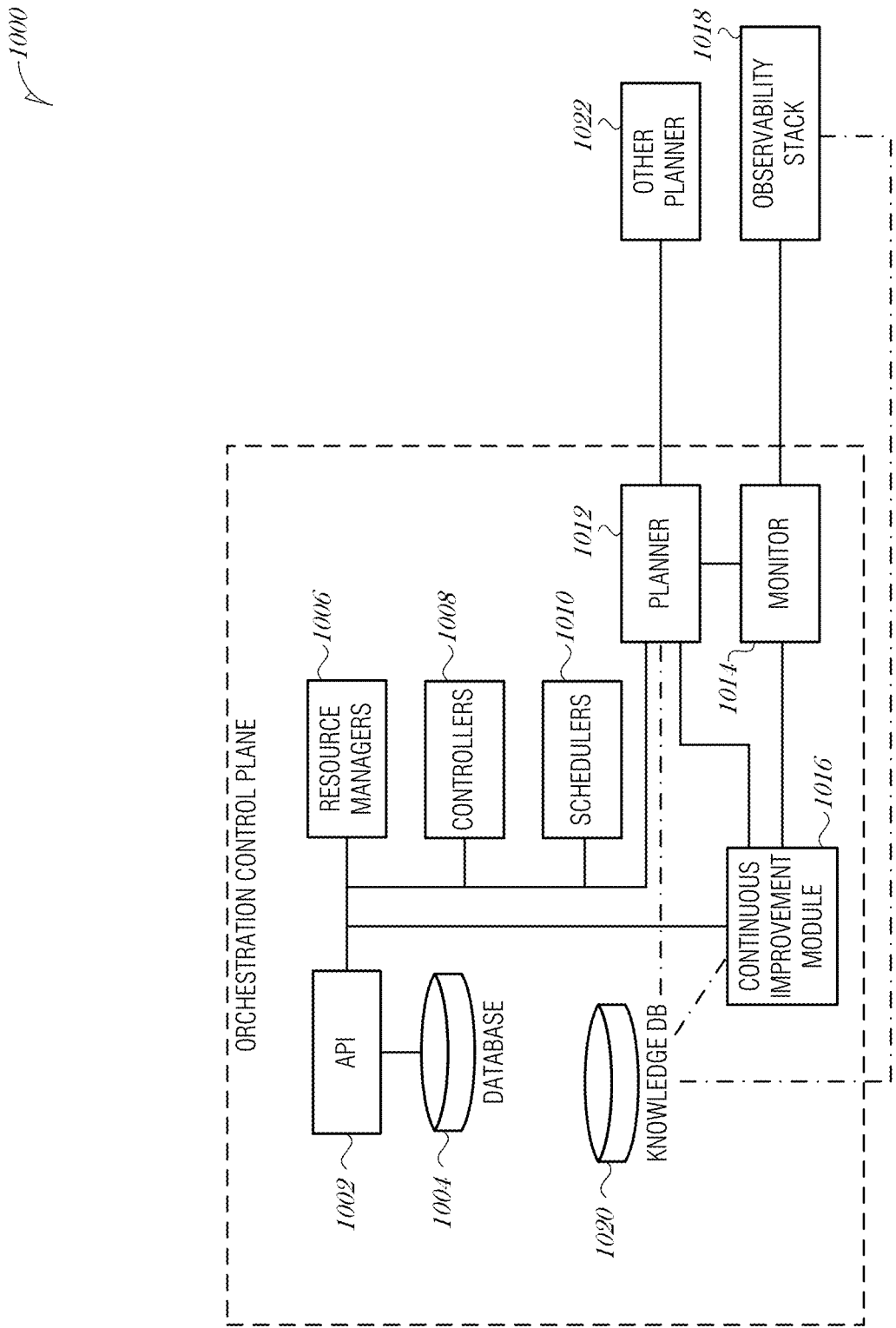
FIG. 10 is a block diagram illustrating an orchestration control plane, according to an embodiment.

FIG. 10 is a block diagram illustrating an orchestration control plane 1000, according to an embodiment. The orchestration control plane 1000 is accessible or configurable using an application programming interface (API) 1002. Settings, data, or other information may be stored in a database 1004. The orchestration control plane 1000 includes resource managers 1006, controllers 1008, schedulers 1010, a planner 1012, a monitor 1014, a continuous improvement module (CIM) 1016, and an observability stack 1018. The planner 1012, CIM 1016, monitor 1014, or other components of the orchestration control plane 1000 may access or store data in a knowledge database 1020. The knowledge database 1020 may include various data used to as input for the planner or schedulers, for instance. The knowledge database 1020 may include network topology information, which could be used to determine placement of tasks and utilization of resources.

The planner 1012 may be implemented using a hardwired circuit, a programmable hardware device (e.g., an ASIC), or as instructions executing on a hardware platform (e.g., on a general CPU). The planner 1012 may be configured, designed, programmed, or otherwise adapted to map intents or objectives to SLOs. The planner 1012 may also break down SLOs into actionable plans. The planner 1012 may be used to automatically translate or map SLO requirements to appropriate pod specifications, which may include resource requirements, platform features, or policies across compute, network, storage, and facilities (e.g., power) domains. Mapping of objectives to policies and lower-level objective settings may implement heuristic, machine learning (ML), or artificial intelligence (AI) mechanisms, workload characterizations (e.g., derived from online data or through offline experimentation, or through sandboxing), or policies from resource owners to guide how to use the owner's system.

The planner 1012 may further be used to coordinate system-to-system (e.g., E2E) with another planner 1022 and map multiple points-of-presence (PoPs) belonging to potentially different stakeholders. Various types of coordination and negotiation schemes may be used. For instance, a multiple attribute utility theory (MAUT) model may be used to negotiate resource allocation.

The planner 1012 oversees translating intents into actional policies, system settings, resource requirements, and the like. It does this based on insights stored in the knowledge database 1020. Once a plan is available, it is implemented and enforced by the schedulers 1010.

A plan may be defined using multiple SLOs at various levels in the orchestration control plane 1000. For instance, SLOs on higher levels of the orchestration control plane 1000 may be used to regulate and control FPS and SLOs on lower levels of the orchestration control plane 1000 may be used to regulate and control IPC. Vendors, users, and service providers may define SLOs using a standardized format. SLOs may also include guardrails, which provide some variation from the target or limit values. For instance, a guardrail may allow for 10% violation of P95 for up to 10 minutes. Guardrails may be conditional as well. For instance, a guardrail may allow for 10% violation of P95 for up to 10 minutes if the system will guarantee P99 compliance thereafter.

With increasing heterogenous compute setups and XPU environments, the lower-level orchestration and resource managers may be configured to support co-scheduling and co-prioritization of workloads at a very granular level.

When assigning tasks to resources, the placement problem is difficult to solve. Unlike cluster-based scheduling, this system allows local resources to be reprioritized based on the closeness of the operation to required completion deadline. Load balance and auto-scale actions initiated locally at graph bottlenecks without having to be driven from a centralized scheduler. These actions are also time limited, as compared to durable instructions from a centralized or hierarchical scheduler.

Some resources, such as processors, may be orchestrated in a manner to optimize power usage. Processor power levels (e.g., PL1, PL2, PL3, etc.) are used to define the threshold power draw. The system platform continually adjusts these PL values and other power values (capping, P state, uncore frequency) in a fine-grained manner But because this is a complex mapping given the highly time-varying, situational nature of transfer function linking performance to power to SLAs, the adjustments are driven through pre-trained models. The pre-trained models take as inputs various timeseries derived trend signals over utilizations and power, and they may in general be models that are trained on a coarse-grained types of workload mixes (e.g., "AI", "gRPC heavy", "media", etc.).

When the customer, expresses storage access intents when registering functions, these registration intents provide sufficient context to the infrastructure layer to enable efficient data movement from storage layer to the function. This is done by either scheduling the function right next to the data, using compute accelerators on servers holding the data or utilizing efficient data transfer mechanisms within or across servers. The key point is that this is achieved without the function needing specific knowledge of the server location or having to program specific compute resources or transfer mechanisms. Scheduling/placement is a function at the start of a process. As access patterns may not be obvious at deployment time, this system also implements a runtime assessment of data locality and transfer rates and using that insight to trigger auto rescheduling events, for instance, histograms that show which function/microservice is good at processing what kind of data.

The CIM 1016 scouts for options to make the current operations more efficient, while analyzing trade-offs or changes in policy, and is in charge of predicting how the system will behave in near future. This prediction is key to enable proactive planning Either reactive or proactive planning may be used with various time scales (to satisfy the various fast/slow) loops.

The monitor 1014 takes inputs from the observability stack 1018 and uses this information to feed or trigger the planner 1012 and CIM 1016. Furthermore, observability stack 1018 is in charge of assuring the insights, heuristics, etc., in the knowledge database 1020 are accurate using online and offline learning processes. The offline learning may be achieved through experiment-based workload characterization. The observability stack 1018 may collect training data to make the architecture self-evolving through analytics that use the collected data. The training data may be derived from real-world data that was captured by monitors. Alternatively, the training data may be prepared offline and provided to the observability stack 1018. Use of a CIM 1016 provides the advantage of having continuous improvement capabilities and enabling self-adaptation, self-healing, and optimization in the system.

Figure 11:
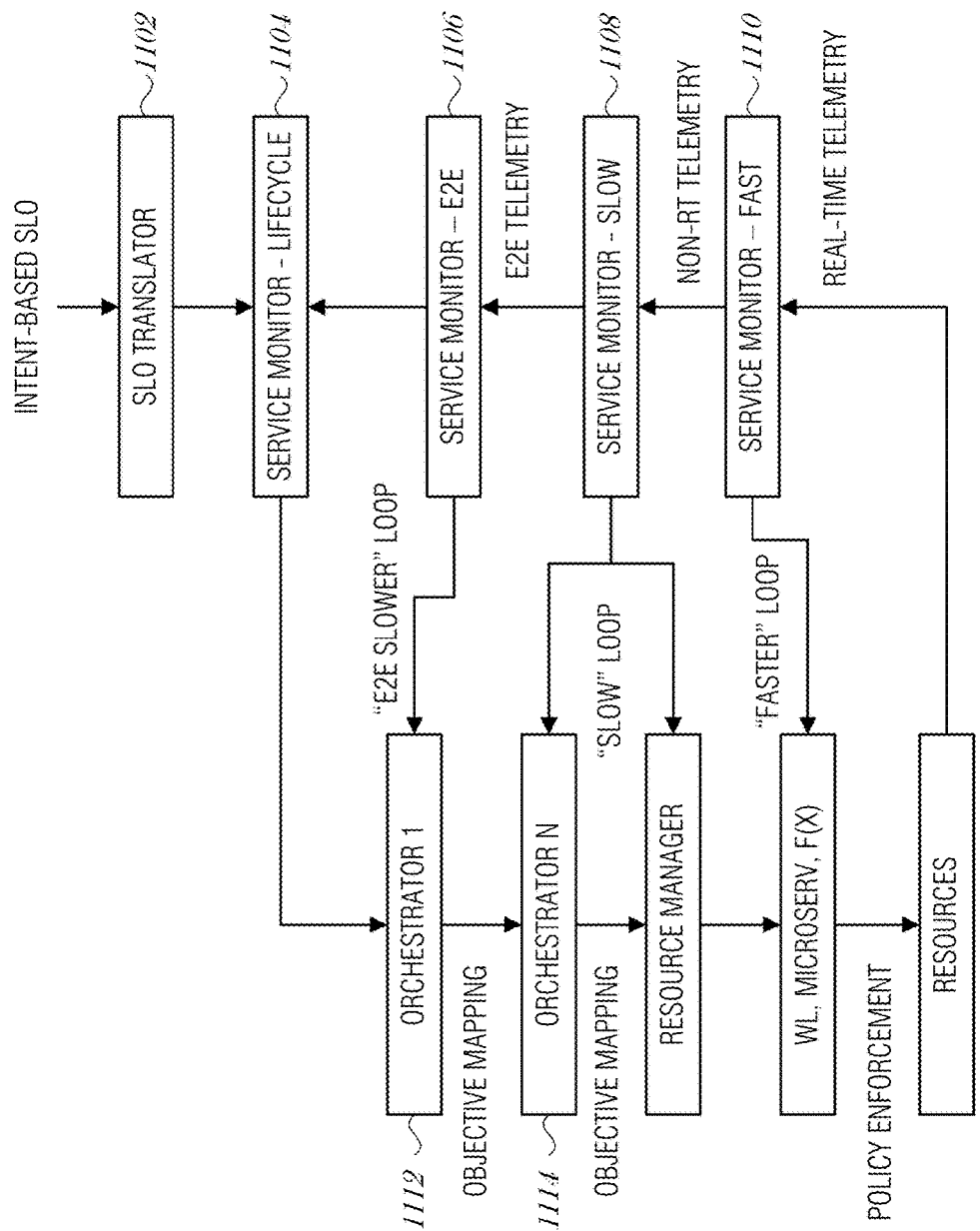
FIG. 11 is a block diagram illustrating data and control flow in an orchestration system, according to an embodiment.

To provide continuous improvement, multiple control loops may be implemented. FIG. 11 is a block diagram illustrating data and control flow in an orchestration system, according to an embodiment. Intent-based SLOs are received at an SLO translator 1102, which feeds the translated SLOs to a service monitor 1104. The SLO translator 1102 may be an instance of, a component of, or include the planner 1012. The service monitor 1104 may be an instance of, a component of, or include the monitor 1014.

The SLO translator 1102 can use a database of rules and dictionaries (e.g., knowledge database 1020) to map the intent-based SLO to three aspects: 1) monitoring parameters, 2) configuration parameters, and 3) time-domain parameters.

The monitoring parameters are used by the service monitor 1104 when monitoring services, tasks, or jobs. Monitoring parameters may include a series of flexible guardrails and required telemetry for the service monitor 1104 to actively monitor the operations.

Guardrails may provide time-bounded and range-bounded flexibility, so that they become context sensitive and situation adaptive. The guardrails that apply on an orchestrator's function may thus shift very slowly but seamlessly to permit maximizing a desirable end-to-end objective by making a series of localized leeways. The idea is to achieve three important flexibilities: a) take the hardest constraint—such as P99.9 latency—and allow it to move from a fixed threshold to a threshold range, say +10 percent for a short duration in time, to be compensated by an even better P99.9 latency for an extended period of time later, b) take a possibly costly adjustment in resource allocation at one time, and move it out by a bounded amount of time, and in the interim, soften the guardrails so that satisfiable solutions can continue to run, and c) permit a richer system response to emergency needs, demands, etc., to deal with transient failures in other parts of a data center which require resources to be shared more flexibly until repair and subsequent normal operations can pick up.

Current methods for guardrails involve using thresholding and integration over a pre-defined period to evaluate a guardrail crossing and subsequent remediation. Allowing guardrails to become "stateful" or "context" based allows hard constraints to be softened during specific conditions. For example, CPU utilization maybe allowed to peak on first deployment of workload as the workload caches data but after that time, in normal operation, excessive CPU utilization can trigger a guardrail crossing. The system adds knowledge of context including life cycle staging, in service upgrades, HA failovers, service mesh restarts, etc. as contextual information for implementing guardrails.

The configuration parameters are used by orchestrators and resource managers to configure compute, network, memory, and other resources. The configuration parameters may be expressed as a series of orchestration objectives, which are fed to the highest-level orchestration system and turned into a series of sub-objectives by each lower layer of the orchestration stack. At the bottom of the orchestration stack are physical hardware components that may be tuned with fine-grained control. As such, a series of resource controllers may enforce policies on the compute platform. The compute platform may be a CPU, GPU, FPGA, accelerator, IPU, or other type of processing device.

The time-domain parameters are used to configure the control loops to set monitoring cycles and how often changes are made to configuration parameters. The SLO translator 1102 generates time domains for SLO monitoring, which range from non-real-time monitoring to real-time monitoring. The time domains specify strict monitoring and orchestration feedback response times for the corresponding SLO. The time domains are shown in FIG. 11 in subjective terminology as "slower," "slow," and "faster," but can be specified in any time measurement, such as microseconds, hours, days, or the like, depending on the requirements mapped by the SLO translator 1102 to the time domain. These time-domain parameters may be fixed, automatically updated, or separately configurable.

The service monitor 1104 has layers that monitor E2E telemetry 1106, non-real-time telemetry 1108, near real-time telemetry or real-time telemetry 1110. Each layer has a corresponding control loop, which may have differing time-domain parameters.

The SLO translator 1102 converts the intents into "Service level monitoring" for E2E, slow resource monitoring, and fast resource monitoring. Based on rules, policies, and learned insights, the SLO translator 1102 maps the intent to one or more service monitors, which may be instantiated based on the type of intent, the reaction speed required, or other requirements. The SLO translator 1102 configures the service monitors to provide notifications to entities in the orchestration stack when the "physical SLAs" or "physical SLOs" are out of bounds. Service monitors can include classic service assurance solutions to monitor E2E SLAs using passive or active probes, software defined networking (SDN) controllers, or SDN analytics systems. Faster service monitors can be colocated on the platforms, as needed, to achieve the response time required by the mapped SLO.

The system may employ methods to inject smart observability, for instance, on the deployment of components, and how to auto-inject the monitoring at the correct location. After deployment of the components, the system may form a part of the control loop that achieves automatic SLW remediation. When there is a case for remediation, the system ensures that sufficient controls are in place to provide a corrective action that is effective and does not impact other services inadvertently.

As illustrated in FIG. 11, intent-based orchestration may be implemented using a hierarchy of orchestrators 1112-1114. A standard orchestrator allows the user to describe an application as a set of components and requirements for landing those components on platforms. Hierarchical orchestration may be used to allow a problem to be broken down and distributed in parts, where a sub-orchestrator is responsible for the schedule a subset of the application on one subset of nodes and another sub-orchestrator is responsible for scheduling a different subset of the application on a different subset of nodes.

In contrast to standard imperative orchestration, intent-based orchestration can be enabled by allowing the user to describe, as part of a component's requirements, an intent. This is a declarative mechanism where the user is declaring a desired outcome. So, instead of expressing specific rules or parameters (such as in imperative mechanisms), the user is able to express a desired result. An example might be to achieve some given level of availability or maximum processing latency, for which multiple instances may be deployed on nodes with specific characteristics to achieve that intent. An intent is a declarative expression.

Rather than deeply integrating intent-based orchestration into a standard orchestrator's scheduler, an intent-based scheduling algorithm may be deployed in a sub-orchestrator. In this case, when the top-level standard orchestrator receives the application description, it may see an intent specified for one or more components of the application. It may choose to request an intent-based sub-orchestrator to do the scheduling of these components. Each intent-based orchestrator or sub-orchestrator may specialize in meeting specific kinds of intents. The intent-based sub-orchestrator may further break down the problem into other sub-orchestrators.

For example, consider a video analytics pipeline consisting of an ingest step, a processing step, and an actuation step. The overall application may be described as an ingest component for each camera, a processing step with an intent of no more than 100 ms of latency, and an actuation component for each actuator. The top-level orchestrator can handle the ingestion and actuation component deployments. The processing could be passed to an intent-based orchestrator which might determine how many processing components are needed to load balance and achieve the desired latency. The intent-based orchestrator may even subdivide the task to additional sub-orchestrators, so that multiple clusters of nodes are used to achieve the intent (or perhaps to enable an additional intent of high availability at a cluster level).

There are several advantages of this approach. First, it is not necessary to merge the complex decision making of existing scheduling algorithms in existing orchestrators with the equally complex decision making of intent based orchestration. Each can be used for the key parts of the problem. In addition, distributed decision making allows the decision to be pushed close to the processing. This may allow for faster reactivity, which will help enable things like fast control loops in industrial use cases.

In various embodiments, a top-level orchestrator is configured, programmed, or otherwise adapted to receive intents from a customer, identify when an intent-based sub-orchestration is required, and define interactions between the top-level orchestrator and sub-orchestrators. The top-level orchestrator may be a standard orchestrator and the sub-orchestrators may be an intent-based orchestrator, such as one described in FIG. 10. By using a hierarchy of orchestrators, the problem is pushed down with an SLA agreed upon between the higher-level orchestrator and the sub-orchestrator. The sub-orchestrator may indicate to the requesting orchestrator when it can no longer meet the SLA.

To achieve this organization of orchestrators, intents should be expressed in a way that is compatible with standard orchestrators and these standard orchestrators should be able to identify when an intent-based sub-orchestration is required. A protocol may be used between the requesting orchestrator and sub-orchestrators that are used to satisfy the requesting orchestrator.

Further, when an application is split into components, which are separately orchestrated, they may have ordering dependencies that affect the overall orchestration. Where such ordering dependencies are present, they may be described in abstract terms. For example, in a use case of a producer-consumer flow, the producing component may be specified as desirably staying X units of data, events, frames, etc. ahead of the consuming component. Accordingly, the sub-orchestrators for each component may have conditional responsibilities for allocation of resources (consumer needing fewer resources at time T0 than at time T0+delta, while the producer needing more resources at time T0−delta than at time T0). These "resource flows" become tightly coordinated among the sub-orchestrators so that the producer and consumer in our example collectively get an X-fraction of the CPU, cache, memory bandwidth, etc., but where the resources flow seamlessly according to the choreographed sharing between them. Similarly, priority inversions need to be prevented; thus, while a producer may have a lower priority because, say the consumer is trying hard to catch up and reduce the distance by which the producer is ahead of it, if the consumer continues to cut the distance so fast that the producer now has to struggle to stay ahead, then it makes sense for the priorities to flow quickly between them as a function of the distance, instead of requiring intrusive tuning of the scheduling software.

To achieve the requested intent/objectives, the demand for acceleration technology (FPGAs, GPUs, etc.) as well as hardware features supporting the overall setup (e.g., DRC) may be implemented. Often, accelerators and XPUs run operations that a CPU code developer does not control directly though instructions. Thus, sensitive operations performed with a certain hardware privilege in an accelerator or an XPU, or in some manner opaque to ordinary software in higher levels of the stack, can simplify the security boundary constraints that would otherwise require co-scheduling of security filtering operations. Furthermore, lower-level features need to inform the various control loops of what is happening in fast control loops. This type of reporting requires extensions/usage of observability frameworks for tracing, logging, and monitoring.

Figure 12:
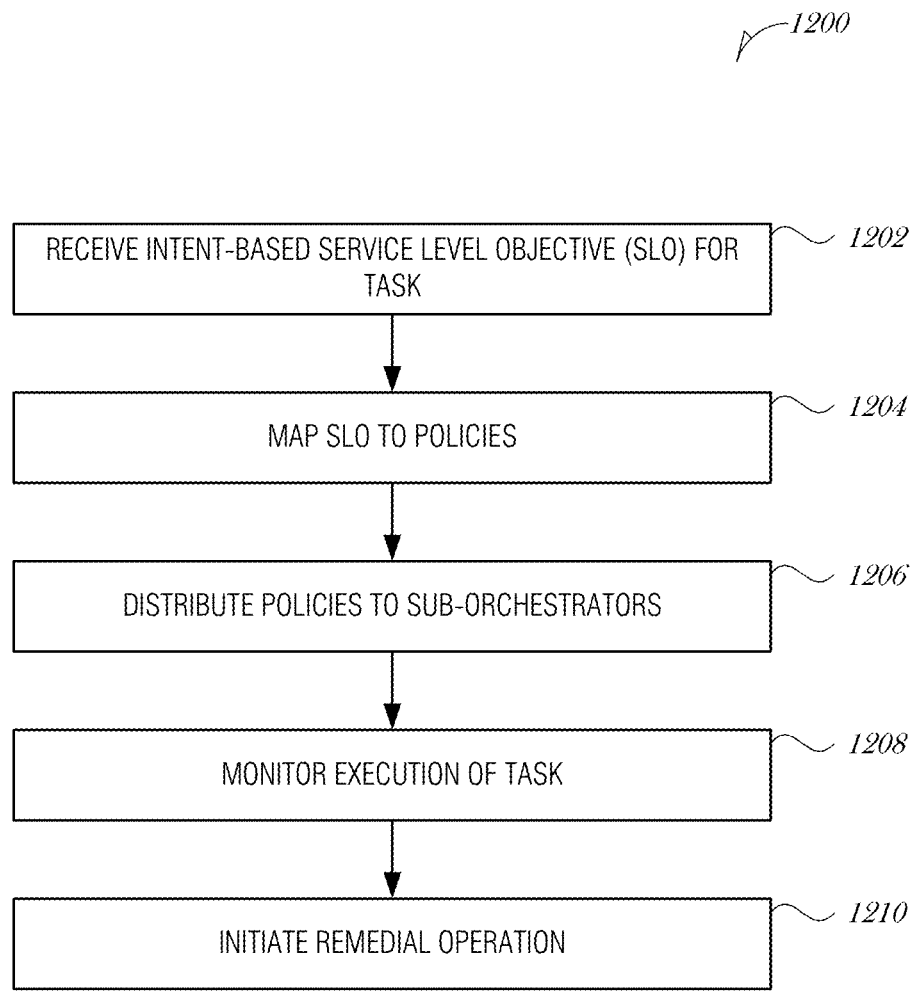
FIG. 12 is a flowchart illustrating a method for implementing intent-based orchestration, according to an embodiment.

FIG. 12 is a flowchart illustrating a method 1200 for implementing intent-based orchestration, according to an embodiment. At 1202, an intent-based service level objective (SLO) for execution of a task is received at an orchestrator.

At 1204, the SLO is mapped to a plurality of policies. The mapping may be based on a static map. Alternatively, the mapping may be performed using heuristics or other intelligent mechanisms.

At 1206, the plurality of policies are distributed to a plurality of sub-orchestrators, where each of the plurality of sub-orchestrators manage execution of a portion of the task. Policies may be grouped or separated by type, by resource, or by other factors. The sub-orchestrators may be responsible for a group of resources, a type of resource, a particular node or set of nodes, or the like.

At 1208, the execution of the task is monitored. Task monitoring may be performed by defining KPIs of interest and then recurringly obtaining data on those KPIs.

At 1210, a remedial operation is initiated based on the monitoring. Remedial operations may include operations such as migration, resource allocation or deallocation, restarting or suspending a process, container, pod, or microservice, or the like.

In previous approaches, when an application owner defines an application to be deployed, whether in the cloud or at the edge, the owner specifies the resources and features that are required to run the application. This is imperative orchestration. The deployment functionality focuses on whether the specified resources are available for the application to be deployed. With the shift to intent-driven systems (i.e., declarative orchestration), the focus of the deployment function is shifted to whether resources could potentially be made available and how to reconfigure the system to make them available. Resources may be of different types while being in the same category: e.g. high-performance Intel Xeon versus several lower-performance Intel Xeon-Ds, or a single large XPU versus several smaller XPUs. Furthermore, a resource itself may contain different types of sub-resources/components, for instance efficient and performant cores, etc.

The configuration parameters are used by orchestrators and resource managers to configure compute, network, memory, and other resources. The configuration parameters may be expressed as a series of orchestration objectives, which are fed to the highest-level orchestration system and turned into a series of sub-objectives by each lower layer of the orchestration stack. At the bottom of the orchestration stack are physical hardware components that may be tuned with fine-grained control. As such, a series of resource controllers may enforce policies on the compute platform. The compute platform may be a CPU, GPU, FPGA, accelerator, IPU, XPU, or other type of processing device.

To achieve the requested intent/objectives, the demand for acceleration technology (FPGAs, GPUs, etc.) as well as hardware features supporting the overall setup (e.g., DRC) may be implemented. Often, accelerators and XPUs run operations that a CPU code developer does not control directly though instructions. Thus, sensitive operations performed with a certain hardware privilege in an accelerator or an XPU, or in some manner opaque to ordinary software in higher levels of the stack, can simplify the security boundary constraints that would otherwise require co-scheduling of security filtering operations. Furthermore, lower-level features need to inform the various control loops of what is happening in fast control loops. This type of reporting requires extensions/usage of observability frameworks for tracing, logging, and monitoring.

Two example use cases are provided in the context of application deployment at a Cloud Service Provider (CSP) and on heterogeneous hardware at the network edge. In a first example use case, an application (App) owner is typically tasked to evaluate and select the Cloud Service Provider (CSP) or resource provider that will run the App. Decisions are made based on CSP provided functionality, cost, and other factors. With more heterogeneity and disaggregation, and a shift to intent-driven systems, the resource providers may not expose whether any particular resources are available but whether they could made available for the App owner. Later, after the App is scheduled to run, the resource provider configures itself as needed. The systems and methods described herein enable an App to be submitted for orchestration to an impartial system, which will: 1) allow CSPs to bid/submit an offer for the App infrastructure requirements; 2) orchestrate the App on the best option available resources considering disaggregation and heterogenous re-configurable platforms; and 3) continuously profile the App execution, and completely or partially migrate the App to the most suitable infrastructure while maintaining Service Level Objectives/Agreements (SLO/SLA).

When using conventional orchestration stacks/control planes, a mapping is completed to map potentially known workloads to available hardware. However, this statis mapping is insufficient when considering an environment with XPUs and components that allows reconfigurability (e.g., FPGA). As such, in another embodiment, systems and methods configure a hardware platform on the fly to match the workloads. This essentially changes the resource management paradigm from mapping workloads to hardware to configuring hardware to accommodate the workloads. Especially for more heterogenous environments this provides benefits for managing the QoS of various workloads in a multi-tenant environment. In effect, the systems and methods described herein provide changes to how orchestration is done. Schedulers are solvers to produce the right resource configuration instead of just seeking for a configuration that may work. The provisioning also changes and requires mechanisms to ensure fast delivery, advanced reservation, predictive instantiation, and the like. These mechanisms are used to mitigate the fact that reconfiguration of the hardware platform may be costly or slower. The use of AI or ML-based systems may be used to produce accurate models on how to setup the system to minimize time spent on reconfiguration.

In another example use case, a flow for an orchestrator requesting and setting up a reconfigurable system can be demonstrated in the context of time-coordinated compute (TCC). An assembly module indicates to the platform what configuration is required. TCC agents determine whether this configuration is achievable and SLOs can be met. The TCC agent configures the platform and afterwards the continuous improvement module verifies the desired configuration.

Figure 13:
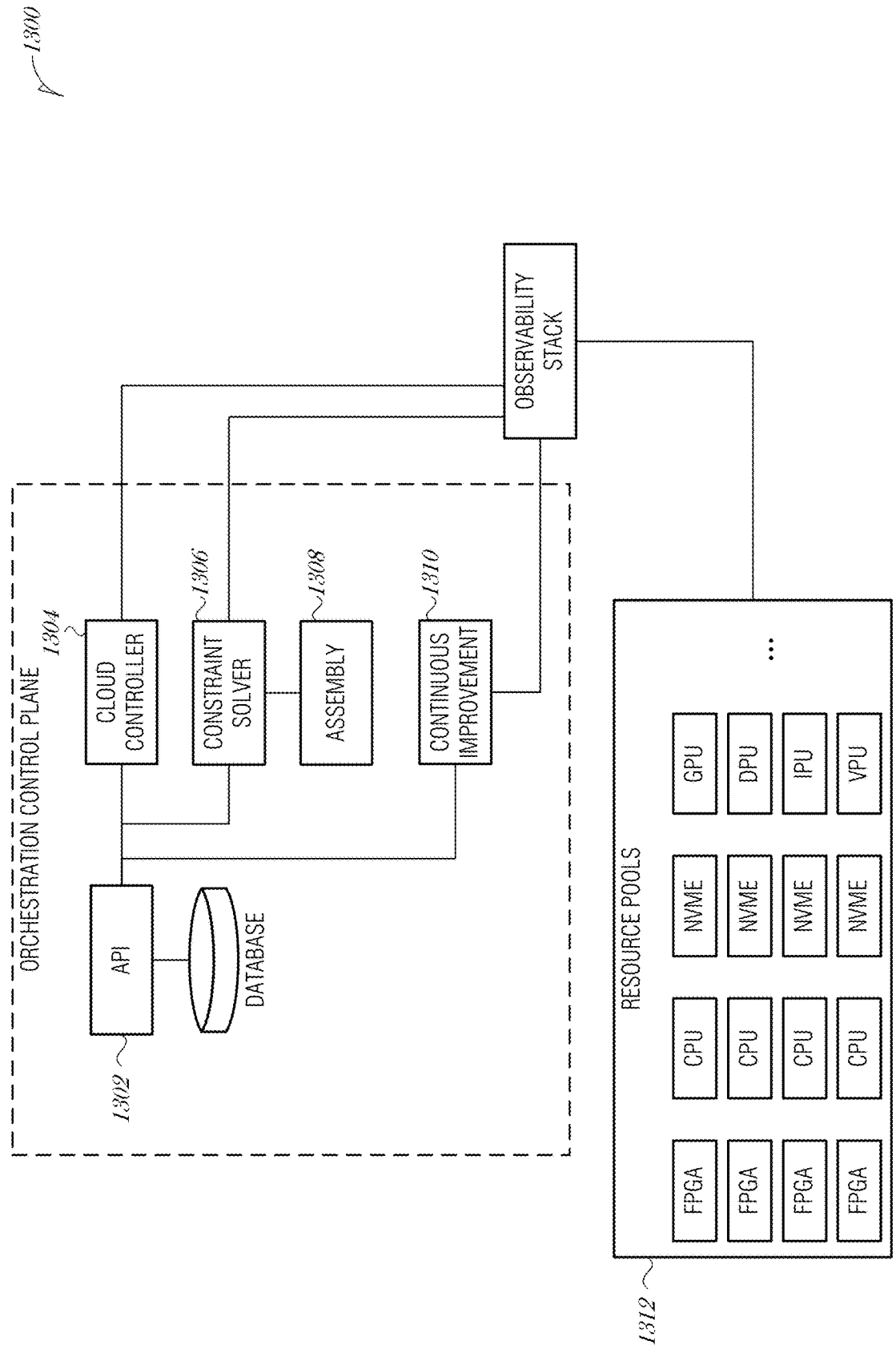
FIG. 13 is a block diagram illustrating an orchestration architecture for providing intent-based orchestration in heterogenous compute platforms, according to an embodiment.

FIG. 13 is a block diagram illustrating an orchestration architecture 1300 for providing intent-based orchestration in heterogenous compute platforms, according to an embodiment. The orchestration architecture 1300 includes an application programming interface (API) 1302, a cloud controller 1304, a constraint solver engine 1306, an assembly engine 1308, and a continuous improvement engine 1310. Portions of the orchestration system described in FIGS. 10-12 may be incorporated into orchestration architecture 1300. For instance, planners, controllers, resource managers, and monitoring facilities may be used by assembly engine 1308 and continuous improvement engine 1310 to deploy workloads, configure hardware, set polices, and the like.

A workload request for a workload may be submitted via the API 1302. The workload request may include business level constraints (e.g., in the form of an intent-based SLA), such as availability and power consumption. The constraint solver engine 1306 receives the intent and workload. It may use a lookup table to determine hardware or resources needed. It may also use heuristic models or other methods to determine the hardware or resources needed for a workload and that conform to an intent. The constraint solver engine 1306 determines resource configurations that may have service impacts of existing deployments or power budget impacts. The constraint solver 1306 may also implement resource scheduling techniques, such as advanced reservation or predictive instantiation of hardware resources (e.g., compute, memory, network facilities, etc.) or software resources (e.g., containers, services, pods, applications, or the like).

These hardware and resource configurations are fed to the assembly engine 1308, which tracks services impacting resource changes and deployment methods. The assembly engine 1308 builds a deployment plan and a resource profile to maintain existing SLOs on platforms for existing deployments, while also meeting power targets. Other deployment restrictions may be generated by the assembly engine 1308. The assembly engine 1308 may interact with hardware to ensure that the correct components are set up. The development plan may be created using a lookup table, using policy based rules, etc.

Using the deployment plan, schedulers, controllers, and resource managers may be used to select the appropriate platform configuration and deploy the workload. Scheduling and provision are part of the provisioning operation, which is a concrete operation versus the higher planning-level operation of the assembly. The continuous improvement engine 1310 is used to monitor real-time telemetry and identify issues, such as SLO violations or low resource utilization. The continuous improvement engine 1310 may use artificial intelligence or machine learning to determine when violations or out-of-bounds errors are likely to occur. The telemetry and associated alerts are fed back to the constraint solver engine 1306 to modify the rules, which are used by the assembly engine 1308 to build a replacement deployment plan.

Resource pools 1312 include various components, such as processing components (e.g., FPGA, CPU, VPU, IPU, GPU, x-PU, etc.), memory components (e.g., NVMe), accelerators, networking components, and the like. The resource pools may be grouped or arranged into a configuration. The reconfigurable configuration may range from provisioning FPGAs to run as soft-core CPUs, selecting large cores from a CPU for latency-critical algorithms that are not easily parallelizable, selecting small cores fully utilized with threads that can run concurrently, etc. Once a resource slice serving the workload is determined, the continuous improvement engine 1310 can ensure that it is the resources that the workload needs. The continuous improvement engine 1310 may also use a feedback loop to determine that a slice worked well, so the constraint solver engine 1306 and assembly engine 1308 may use the slice again in the future for a similar workload.

The assembly engine 1308 may use a mix of greedy assignments and predictive machine-learning assignments. The assembly engine 1308 may account for performance models describing the various behaviors of the cores (e.g., large and small cores). Performance models may be derived using machine learning techniques and may be used to estimate the correct node to place workloads based on the cores available in the node. In newer core architecture that mix small and large cores on the same die, the assembly engine 1308 may use performance models that account for the heterogenous nature of such hybrid processors.

Additionally, the assembly engine 1308 may be aware of the characteristics of nodes and node pools. Node pools are typically characterized with their physical location (data center/zone) and machine type. The end user is expected to pick the node instances that are the best fit for the application or the orchestration system auto picks the best node on their behalf. For some use cases this may be sub-optimal and some node parameters may require tweaking. As such, the assembly engine 1308 enables methodologies for the cluster/node provisioner to automatically select and configure the most suitable node and settings on it based on a user's intent (e.g., use case/application, budget/cost). For instance, the end user may specify a node passlist and a node blocklist, where the user may indicate certain nodes as permitted to use, do not care (DNC), or excluded from use, to filter nodes that are used for a workload. Permitted nodes and DNC nodes may be used with permitted nodes being preferred. Excluded nodes are not eligible for the workload.

In another implementation, an end user may not specify everything, but just specify constraints (such as cost, failure tolerance, (ability to complete within a deadline), ability to use acceleration, etc.), alongside service level objectives such as throughputs, tail latencies, packet drop rate, etc., and let the assembly engine 1308 recommend the most suitable node settings to configure them. The end user may be presented the suggested configuration settings in the API 1302. The end user may then trigger the configuration of the nodes according to the suggested configuration using the API 1302. Alternatively, the assembly engine 1308 may automatically trigger the configuration of the nodes after determining the most suitable configuration.

In another implementation, a multi-pass/hierarchical SLO mapping and conditional intent-based scheduling can be used in addition to a hard match or 'don't care' policies. For example, the user may express: "I want the best performance available (first) but I will take what I can get, as long as the service is resilient." This SLO statement uses a mapping component to generate the multiple inputs to a scheduler, with a hierarchy to match and a 'minimum' configuration set to match as guardrails. This multi-pass SLO mapping mechanism also takes as input the cluster administrator policy that can be used to dynamically condition or constrain the options available to the assembly engine 1308. For example, the administrator policy inputs may set guardrails on the frequency of hardware configuration or assembly events, aggressiveness on coalescing workloads to some nodes, aggressiveness on cluster level and node level power conditioning, accessibility of tenants to particular capabilities within the infrastructure, etc.

Workload security is an issue with resource sharing. To address this, the systems and methods described herein provide sub-process or module-granular security. In an implementation, hardware support for hardening container namespaces is used so that different disaggregated resources can be supported with resource manager shims. This permits rapid integration of logical servers as sandboxes within a commonly addressed container domain for which isolation is through dynamically assigned keys (enforced by hardware mediated indirection). Keys may be used to encrypt and secure container processing at a node. Effectively this places resource users in thin isolation partitions with partition boundaries movable to achieve flexible assignments. In another implementation, the systems and methods provide sub-container sandboxing so that containers do not need to be rebuilt with new resource assignments but can shift resources between lightweight sandboxes.

Figure 14:
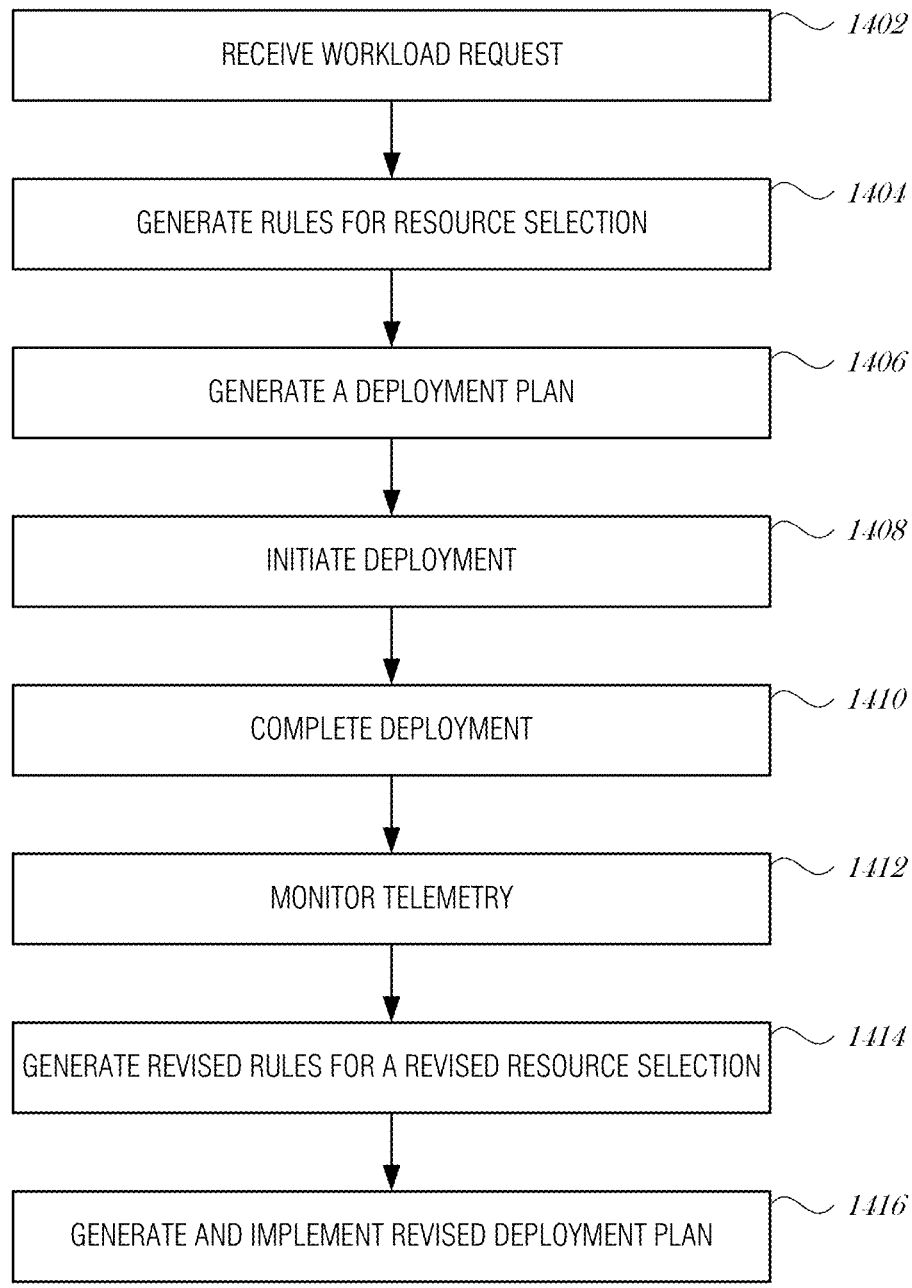
FIG. 14 is a flowchart illustrating a method for intent-based orchestration in heterogenous compute platforms, according to an embodiment.

FIG. 14 is a flowchart illustrating a method 1400 for intent-based orchestration in heterogenous compute platforms, according to an embodiment. At 1402, a workload request is received at an API. At 1404, a constraint solver generates rules for resource selection. At 1406, an assembler function generates a deployment plan, resource profiles, and deployment restrictions (e.g., policies or guardrails). At 1408, deployment is initiated and an appropriate platform is selected for deployment. At 1410, deployment is completed and continuous monitoring is initiated (1412). The continuous monitoring uses real-time telemetry that may indicate SLO violations or other hardware or software conditions. Using rules, policies, thresholds, or other guidance, the constraint solver may be used to generate revised rules for a revised resource selection (operation 1414). These revised rules are then used by the assembler function in the redeployment cycle (operation 1416).

Figure 15:
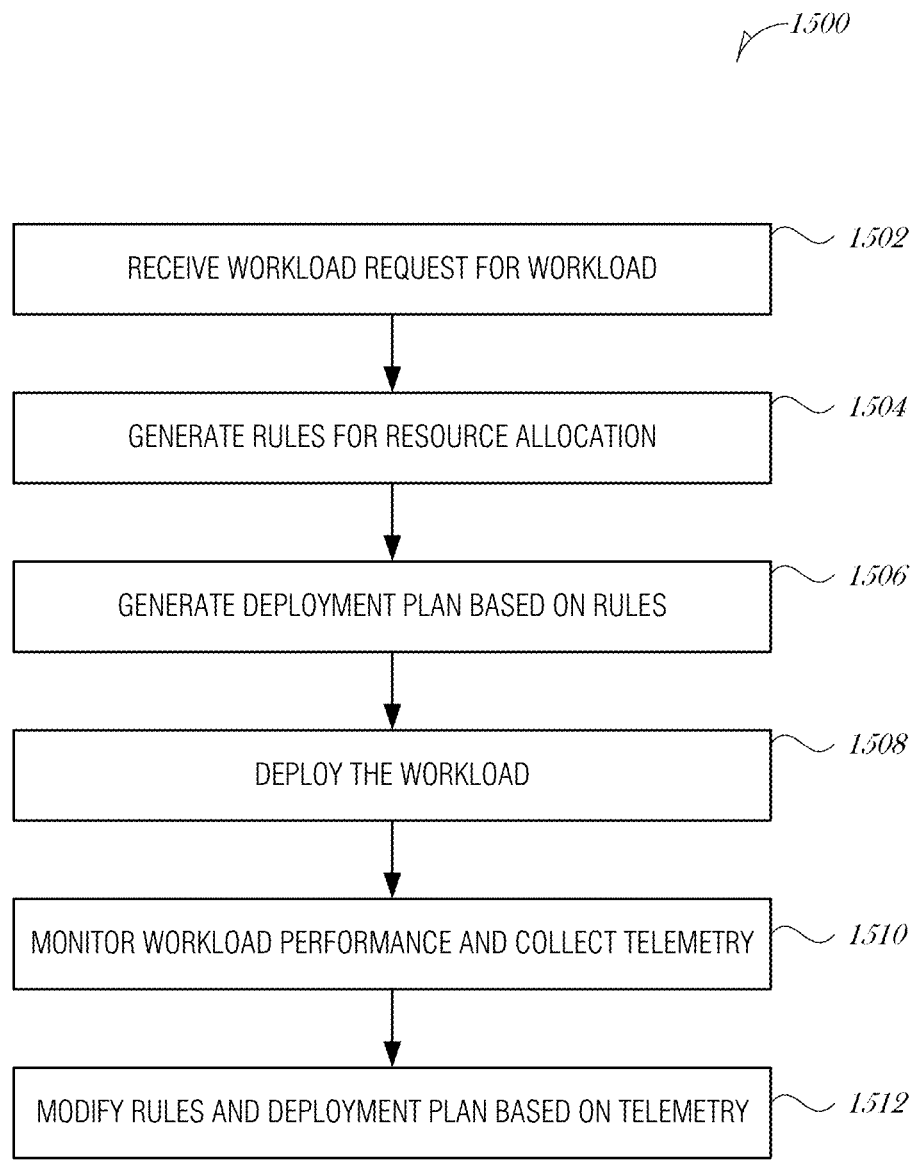
FIG. 15 is a flowchart illustrating a method for intent-based orchestration in heterogenous compute platforms.

FIG. 15 is a flowchart illustrating a method 1500 for intent-based orchestration in heterogenous compute platforms, according to an embodiment. At 1502, the method 1500 includes receiving, at an orchestration system, a workload request for a workload, the workload request including an intent-based service level objective (SLO).

At 1504, the method 1500 includes generating rules for resource allocation based on the workload request. In an embodiment, the rules for resource allocation are generated based on lookup tables. In a further embodiment, the lookup tables match a type of workload to resources from a pool of resources.

At 1506, the method 1500 includes generating a deployment plan using the rules for resource allocation and the intent-based SLO. In an embodiment, the deployment plan includes a reservation of resources for the workload. In a related embodiment, the deployment plan includes a predictive instantiation of resources for the workload. In an embodiment, the deployment plan is generated using a machine learning model.

In an embodiment, the deployment plan is used to reconfigure hardware resources to service the workload request. In a further embodiment, to reconfigure hardware, the deployment plan is used to program a programmable hardware unit. In a further embodiment, the programmable hardware unit is a field-programmable gate array (FPGA).

In an embodiment, the deployment plan includes a specification of a type of core to use. In a further embodiment, multiple different types of cores are disposed on the same die.

In an embodiment, the deployment plan includes a specification of a node instance to use. In a further embodiment, the node instance is provided by an owner of the workload. In a further embodiment, the owner of the workload provides nodes that are permitted for the workload and nodes that are not permitted for the workload.

In an embodiment, the deployment plan includes a security mechanism to isolate a workload container from other containers executing on a node, the workload container associated with the workload and the other containers not associated with the workload. In a further embodiment, the security mechanism includes dynamically assigned keys to encrypt container processing at the node.

At 1508, the method 1500 includes deploying the workload using the deployment plan.

At 1510, the method 1500 includes monitoring performance of the workload using real-time telemetry. In an embodiment, to monitor performance of the workload, a pseudo-sidecar that is deployed with the workload and is executing on a compute node, is configured to collect and report the real-time telemetry. In a further embodiment, the pseudo-sidecar is one of a plurality of pseudo-sidecars deployed with corresponding containers that are configured to execute the workload. In a further embodiment, a node agent executing at the compute node is used to monitor performance of the workload and modify the rules for resource allocation.

At 1512, the method 1500 includes modifying the rules for resource allocation and the deployment plan based on the real-time telemetry. In an embodiment, modifying the rules for resource allocation and the deployment plan includes profiling execution of the workload and migrating a portion of the workload to a different compute node to improve compliance with the intent-based SLO.

Orchestration is a highly-complex endeavor. There is a need to provide a more efficient orchestration system. In conventional systems, observability and actuation components in the orchestration control plane follow a notion of monitoring and controlling a single service component or a single node or resource. This means that configurations and policies are enforced on sets of components. For instance, an annotation to a pod to use four last-level cache (LLC) ways for five replicas running on five hosts results in each host using up four cache ways for running that pod. It would have been fine to only set aside cache ways on the pods running on the congested nodes instead of all nodes. Mechanisms described here provide a more efficient orchestration by using pseudo sidecars.

A pseudo-sidecar may be implemented in various ways. A pseudo-sidecar may be implemented like conventional sidecars as a utility container inside of a pod that is loosely coupled to the application container. A pseudo-sidecar may also be deployed as extensions (e.g., extended Berkeley Packet Filter (eBPF), WebAssembly (wasm), etc.) to services meshes (e.g., Cilium ClusterMesh, Istio, etc.). This type of implementation may be different from conventional sidecars but have similar behavior. For instance, an extension like eBPF allows for the use of special programs that run inside of an operating system in an isolated way. Observability data from applications or network resources may be collected.

Figure 16:
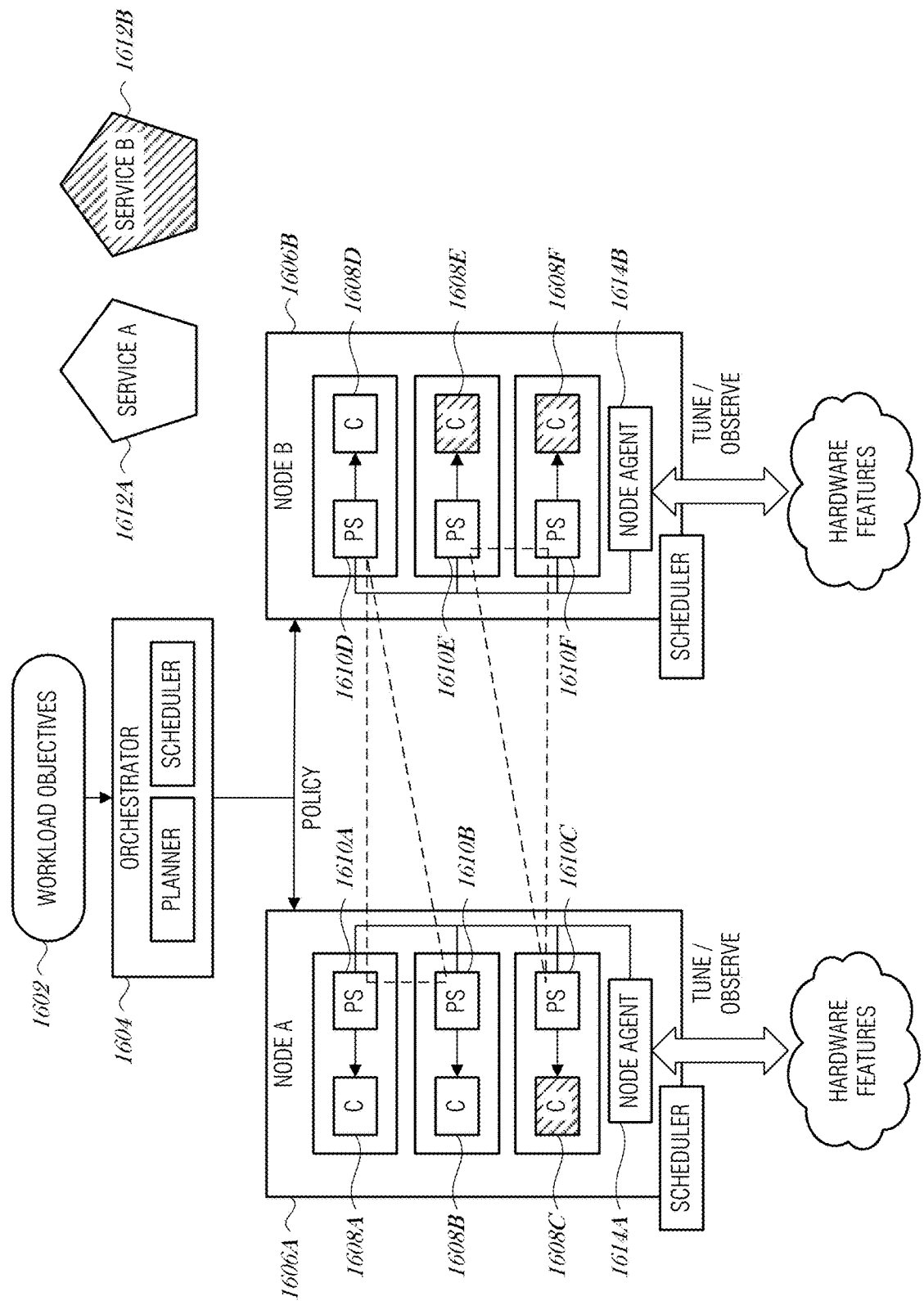
FIG. 16 is a block diagram illustrating data and control flow to implement pseudo-sidecars, according to an embodiment.

FIG. 16 is a block diagram illustrating data and control flow to implement pseudo-sidecars, according to an embodiment. Workload objectives 1602 are received at an orchestrator system 1604. Policies (e.g., SLO) are pushed down to nodes 1606A and 1606B. Containers 1608A, 1608B, 1608C, 1608D, 1608E, 1608F (collectively referred to as 1608) are deployed on the nodes 1606A and 1606B. Containers 1608A, 1608B, and 1608D are related to each other as part of a service 1612A, while containers 1608C, 1608E, and 1608F are related to each other as part of a service 1612B. Each container 1608 has a pseudo-sidecar 1610A, 1610B, 1610C, 1610D, 1610E, 1610F (collectively referred to as 1610).

The pseudo-sidecars 1610 coordinate to ensure that the node, platform, facilities, etc. associated with the corresponding container 1608 are set up correctly so that the objectives of their workload can be met. Pseudo-sidecars 1610 may communicate with a node agent 1614A or 1614B (collectively 1614) and the node agent 1614 may enforce policies, allocate resources according to policies, tune settings so that the intents of the pods can be met, etc. The node agent 1614 may make the final decision whether a particular node configuration is activated based on quotas, security policies, operational policies, etc. Using this mechanism, a planning component can insert annotations/labels on the pod specs and the pseudo-sidecar 1610 can figure out ways to make sure that high priority jobs and low priority jobs use the appropriate resources.

If a pod is migrated or restarted on another node, the pod can perform coordination to determine how to set up the platform in relation to the other pods already present. Resource allocations are done dynamically in a post-instantiation phase. Effectively the pseudo-sidecar 1610 takes on a role of closing a faster scheduling/resource allocation closed loop operation on the node.

Using this mechanism and arrangement, a conventional scheduler, like the one Kubernetes already has, can still be kept simple. The scheduler can be used to look at required capacities and figure out if a pod is a good match for a node, but details of resource provisioning can be dealt with by the node or other infrastructure components. This provides the advantage of being able to inject intelligent control plane components while making integration with existing Kubernetes systems relatively simple. An additional advantage is the insights available from a pseudo-sidecar, which may improve scheduling functions. A further advantage to the described systems is the use of a node-level agent. The node agent is able to communicate with pseudo-sidecars belonging to pods of one service with pseudo-sidecars belonging to pods of a different service. Node agents may also communicate amongst each other to provide a node-to-node network that allows a node agent to track activities of a service even if the pods are on different nodes. Because pseudo-sidecars travel with the pod. Thus, the node agent is provided a service-level view instead of a pod-level view. This allows the node agent to make more informed and intelligent decisions. Overall, this also better fits an XPU world. Instead of having an orchestrator directly coordinate with each individual pseudo-sidecar, the pseudo-sidecars on a host may all coordinate with a host agent.

The arrangement of pseudo-sidecars and host agents provides more flexible orchestration. For example, assume there are five replicas in a deployment. Three of the replicas on a host have high LLC miss rates because of neighboring workloads, while the other two are on nodes that are fine. The orchestrator only needs to tune cache ways on the nodes with saturated cache, hence saving precious classes of service.

Additionally, pseudo-sidecars 1610 may be used for observability as well as policy enforcement. The pseudo-sidecars may be configured, programmed, or directed to monitor specific types of operational telemetry. Such telemetry may be useful for a planner to quickly assess the direct causes of various problems or contributing factors. For instance, there may be latency spikes that are not easily explained through some regular telemetry. A planner may insert a specific pseudo-sidecar, or configure an existing pseudo-sidecar, to collect different telemetry or collect telemetry in a different way to gain insight. Further, the pseudo-sidecar may be configured to collect information about neighboring nodes. Pseudo-sidecars may also use various techniques to 1) reduce the amount of data needed to describe the container performance by looking into adaptive monitoring (e.g., adjust instrumentation frequency) or 2) provide useful derived or summarized statistics or metrics (e.g., IPC/queries, IPC/Watt, queries/watt, etc.). Overall, this may reduce the amount of instrumentation data needing to be moved around and allow for easier management.

The pseudo-sidecar can be expanded to support collection of key infrastructure telemetry from an infrastructure proxy agent, which allows the pseudo-sidecar to run in unprivileged containers. A pseudo-sidecar in unprivileged containers can collect telemetry that is key to the operation of the application in the container, such as memory size available and disk size available, but does not require access to privileged operating system interfaces. The deployment of the sidecar with the application in an unprivileged container allows one set of key telemetry to be monitored, while a platform collector deployed to host operating system can operate in a privileged domain and collect additional platform metrics, which can be combined in the monitoring and analytics system, with the telemetry from sidecar to provide an overall view of the operation of the application and any impacts from the infrastructure provided resources that the application is dependent on for operation. This mechanism allows accurate resource evaluations to be carried out locally and then coordinated between distributed sidecar.

In addition, a pseudo-sidecar can automatically detect misconfiguration or sub-optimal configuration of the platform. Each pseudo-sidecar can report if the minimum and maximum required resources associated with the workload are unavailable or below a minimum or above maximum requirement. Alternatively, each pseudo-sidecar can report minimum and maximum resource requirements to the node agent for a collaborative check against available shared resources.

Further, a pseudo-sidecar can automatically detect software failures or errors that occur on a platform. Software failures include, but are not limited to operating system (OS) detected faults or errors, virtual switching faults or errors, service mesh faults or errors, virtualization faults or errors, container layer faults or errors, and the like.

While conventional sidecars are a standard approach for observability with telegraf, open telemetry, etc., the methods to identify, filter, and reduce the telemetry for the specific workload and workload resources has been identified as a challenge by a number of service assurance customers. The control side requires additional components at the Network Function Virtualization Orchestrator (NFVO), which is part of a NFV MANO (Management and Orchestration) stack, and platform resource control to resolve potentially conflicting QOS related controls on the platform.

In another implementation, different observability zones may be associated to tenants or group of tenants. This allows the orchestration system to observe the compute system from different perspectives. For instance, the orchestration system may want to observe and monitor flows between two services for particular tenants and monitor particular metrics. QoS may also be enforced in the same way.

The insights derived from the pseudo-sidecar operation focusing on dynamically allocating resources to the pods can be passed back up to the node-level and cluster-level scheduling routines to further inform and improve the initial placement decision for the particular workload or class of workload.

On the policy enforcement side, the pseudo-sidecar receives the workload policy requirements as well as the administratively-defined cluster-level policy constraints. During fast control loop allocation of resources, the pseudo-sidecar can enforce both sets of policies. In the case of a disconnect between the user requested policy and the cluster admin policy, the pseudo-sidecar can notify the higher-level orchestration system of the disconnect, and then under additional policy decide to prioritize which set of policies to prefer compliance with and over what period to prefer that particular compliance.

Both the observability and policy aspects may be co-engineered between applications and pseudo-sidecars (which may be process or library based) so that enlightened applications may work dynamically in a bi-directional way to achieve their configured SLAs. Specifically, this means that rather than the pseudo-sidecar being just a proxy to the platform, it is a medium of achieving a separation of the internal representation of resource allocations (for meeting SLA objectives) from the presented representation.

Figure 17:
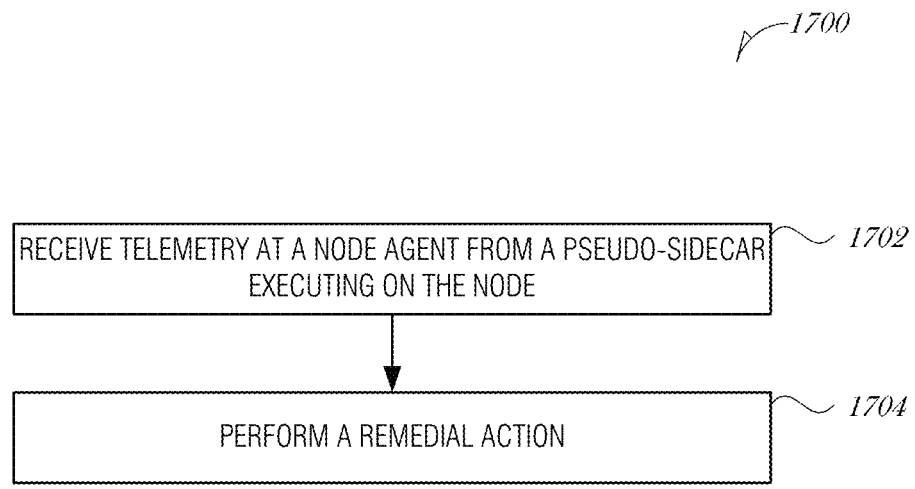
FIG. 17 is a flowchart illustrating a method for orchestration of a service on a plurality of compute nodes, according to an embodiment.

FIG. 17 is a flowchart illustrating a method 1700 for orchestration of a service on a plurality of compute nodes, according to an embodiment. At 1702, telemetry from a pseudo-sidecar is received at a node agent that is executing on a compute node of the plurality of compute nodes. The pseudo-sidecar being associated with a container executing on the compute node, and the pseudo-sidecar one of a plurality of pseudo-sidecars that are associated with a corresponding plurality of containers executing on the plurality of compute nodes.

At 1704, the node agent initiates a remedial action based on the telemetry from the pseudo-sidecar. The telemetry may be aggregated telemetry from the plurality of pseudo-sidecars, where the plurality of pseudo-sidecars share telemetry between each other.

The remedial action may be providing a status update to a orchestration system based on reviewing the telemetry based on a policy that is in-force at the compute node to determine whether the execution of the container is violating the policy. The remedial action may be tuning settings at the compute node to conform to a policy that is in force at the compute node.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, engines, or mechanisms. Such logic or components may be hardware, software-configured hardware, or firmware communicatively coupled to one or more processors in order to carry out the operations described herein. Logic or components may be hardware modules (e.g., IP block), and as such may be considered tangible entities capable of performing specified operations and may be configured or arranged in a certain manner In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

ADDITIONAL NOTES & EXAMPLES

Example 1 is an orchestration system for implementing intent-based orchestration in heterogenous compute platforms, comprising: a processor; and memory to store instructions, which when executed by the processor, cause the orchestration system to: receive, at the orchestration system, a workload request for a workload, the workload request including an intent-based service level objective (SLO); generate rules for resource allocation based on the workload request; generate a deployment plan using the rules for resource allocation and the intent-based SLO; deploy the workload using the deployment plan; monitor performance of the workload using real-time telemetry; and modify the rules for resource allocation and the deployment plan based on the real-time telemetry.

In Example 2, the subject matter of Example 1 includes, wherein the rules for resource allocation are generated based on lookup tables.

In Example 3, the subject matter of Example 2 includes, wherein the lookup tables match a type of workload to resources from a pool of resources.

In Example 4, the subject matter of Examples 1-3 includes, wherein the deployment plan includes a reservation of resources for the workload.

In Example 5, the subject matter of Examples 1-4 includes, wherein the deployment plan includes a predictive instantiation of resources for the workload.

In Example 6, the subject matter of Examples 1-5 includes, wherein the deployment plan is generated using a machine learning model.

In Example 7, the subject matter of Examples 1-6 includes, wherein the deployment plan is used to reconfigure hardware resources to service the workload request.

In Example 8, the subject matter of Example 7 includes, wherein to reconfigure hardware, the deployment plan is used to program a programmable hardware unit.

In Example 9, the subject matter of Example 8 includes, wherein the programmable hardware unit is a field-programmable gate array (FPGA).

In Example 10, the subject matter of Examples 1-9 includes, wherein the deployment plan includes a specification of a type of core to use.

In Example 11, the subject matter of Example 10 includes, wherein multiple different types of cores are disposed on the same die.

In Example 12, the subject matter of Examples 1-11 includes, wherein the deployment plan includes a specification of a node instance to use.

In Example 13, the subject matter of Example 12 includes, wherein the node instance is provided by an owner of the workload.

In Example 14, the subject matter of Example 13 includes, wherein the owner of the workload provides nodes that are permitted for the workload and nodes that are not permitted for the workload.

In Example 15, the subject matter of Examples 1-14 includes, wherein the deployment plan includes a security mechanism to isolate a workload container from other containers executing on a node, the workload container associated with the workload and the other containers not associated with the workload.

In Example 16, the subject matter of Example 15 includes, wherein the security mechanism includes dynamically assigned keys to encrypt container processing at the node.

In Example 17, the subject matter of Examples 1-16 includes, wherein to modify the rules for resource allocation and the deployment plan, the orchestration system is to: profile execution of the workload; and migrate a portion of the workload to a different compute node to improve compliance with the intent-based SLO.

In Example 18, the subject matter of Examples 1-17 includes, wherein to monitor performance of the workload, a pseudo-sidecar that is deployed with the workload and is executing on a compute node, is configured to collect and report the real-time telemetry.

In Example 19, the subject matter of Example 18 includes, wherein the pseudo-sidecar is one of a plurality of pseudo-sidecars deployed with corresponding containers that are configured to execute the workload.

In Example 20, the subject matter of Example 19 includes, wherein a node agent executing at the compute node is used to monitor performance of the workload and modify the rules for resource allocation.

Example 21 is at least one machine-readable medium including instructions for implementing intent-based orchestration in heterogenous compute platforms, which when executed by a machine, cause the machine to perform operations comprising: receiving, at an orchestration system, a workload request for a workload, the workload request including an intent-based service level objective (SLO); generating rules for resource allocation based on the workload request; generating a deployment plan using the rules for resource allocation and the intent-based SLO; deploying the workload using the deployment plan; monitoring performance of the workload using real-time telemetry; and modifying the rules for resource allocation and the deployment plan based on the real-time telemetry.

In Example 22, the subject matter of Example 21 includes, wherein the rules for resource allocation are generated based on lookup tables.

In Example 23, the subject matter of Example 22 includes, wherein the lookup tables match a type of workload to resources from a pool of resources.

In Example 24, the subject matter of Examples 21-23 includes, wherein the deployment plan includes a reservation of resources for the workload.

In Example 25, the subject matter of Examples 21-24 includes, wherein the deployment plan includes a predictive instantiation of resources for the workload.

In Example 26, the subject matter of Examples 21-25 includes, wherein the deployment plan is generated using a machine learning model.

In Example 27, the subject matter of Examples 21-26 includes, wherein the deployment plan is used to reconfigure hardware resources to service the workload request.

In Example 28, the subject matter of Example 27 includes, wherein to reconfigure hardware, the deployment plan is used to program a programmable hardware unit.

In Example 29, the subject matter of Example 28 includes, wherein the programmable hardware unit is a field-programmable gate array (FPGA).

In Example 30, the subject matter of Examples 21-29 includes, wherein the deployment plan includes a specification of a type of core to use.

In Example 31, the subject matter of Example 30 includes, wherein multiple different types of cores are disposed on the same die.

In Example 32, the subject matter of Examples 21-31 includes, wherein the deployment plan includes a specification of a node instance to use.

In Example 33, the subject matter of Example 32 includes, wherein the node instance is provided by an owner of the workload.

In Example 34, the subject matter of Example 33 includes, wherein the owner of the workload provides nodes that are permitted for the workload and nodes that are not permitted for the workload.

In Example 35, the subject matter of Examples 21-34 includes, wherein the deployment plan includes a security mechanism to isolate a workload container from other containers executing on a node, the workload container associated with the workload and the other containers not associated with the workload.

In Example 36, the subject matter of Example 35 includes, wherein the security mechanism includes dynamically assigned keys to encrypt container processing at the node.

In Example 37, the subject matter of Examples 21-36 includes, wherein modifying the rules for resource allocation and the deployment plan, includes: profiling execution of the workload; and migrating a portion of the workload to a different compute node to improve compliance with the intent-based SLO.

In Example 38, the subject matter of Examples 21-37 includes, wherein to monitor performance of the workload, a pseudo-sidecar that is deployed with the workload and is executing on a compute node, is configured to collect and report the real-time telemetry.

In Example 39, the subject matter of Example 38 includes, wherein the pseudo-sidecar is one of a plurality of pseudo-sidecars deployed with corresponding containers that are configured to execute the workload.

In Example 40, the subject matter of Example 39 includes, wherein a node agent executing at the compute node is used to monitor performance of the workload and modify the rules for resource allocation.

Example 41 is a method for implementing intent-based orchestration in heterogenous compute platforms, comprising: receiving, at an orchestration system, a workload request for a workload, the workload request including an intent-based service level objective (SLO); generating rules for resource allocation based on the workload request; generating a deployment plan using the rules for resource allocation and the intent-based SLO; deploying the workload using the deployment plan; monitoring performance of the workload using real-time telemetry; and modifying the rules for resource allocation and the deployment plan based on the real-time telemetry.

In Example 42, the subject matter of Example 41 includes, wherein the rules for resource allocation are generated based on lookup tables.

In Example 43, the subject matter of Example 42 includes, wherein the lookup tables match a type of workload to resources from a pool of resources.

In Example 44, the subject matter of Examples 41-43 includes, wherein the deployment plan includes a reservation of resources for the workload.

In Example 45, the subject matter of Examples 41-44 includes, wherein the deployment plan includes a predictive instantiation of resources for the workload.

In Example 46, the subject matter of Examples 41-45 includes, wherein the deployment plan is generated using a machine learning model.

In Example 47, the subject matter of Examples 41-46 includes, wherein the deployment plan is used to reconfigure hardware resources to service the workload request.

In Example 48, the subject matter of Example 47 includes, wherein to reconfigure hardware, the deployment plan is used to program a programmable hardware unit.

In Example 49, the subject matter of Example 48 includes, wherein the programmable hardware unit is a field-programmable gate array (FPGA).

In Example 50, the subject matter of Examples 41-49 includes, wherein the deployment plan includes a specification of a type of core to use.

In Example 51, the subject matter of Example 50 includes, wherein multiple different types of cores are disposed on the same die.

In Example 52, the subject matter of Examples 41-51 includes, wherein the deployment plan includes a specification of a node instance to use.

In Example 53, the subject matter of Example 52 includes, wherein the node instance is provided by an owner of the workload.

In Example 54, the subject matter of Example 53 includes, wherein the owner of the workload provides nodes that are permitted for the workload and nodes that are not permitted for the workload.

In Example 55, the subject matter of Examples 41-54 includes, wherein the deployment plan includes a security mechanism to isolate a workload container from other containers executing on a node, the workload container associated with the workload and the other containers not associated with the workload.

In Example 56, the subject matter of Example 55 includes, wherein the security mechanism includes dynamically assigned keys to encrypt container processing at the node.

In Example 57, the subject matter of Examples 41-56 includes, wherein modifying the rules for resource allocation and the deployment plan, includes: profiling execution of the workload; and migrating a portion of the workload to a different compute node to improve compliance with the intent-based SLO.

In Example 58, the subject matter of Examples 41-57 includes, wherein to monitor performance of the workload, a pseudo-sidecar that is deployed with the workload and is executing on a compute node, is configured to collect and report the real-time telemetry.

In Example 59, the subject matter of Example 58 includes, wherein the pseudo-sidecar is one of a plurality of pseudo-sidecars deployed with corresponding containers that are configured to execute the workload.

In Example 60, the subject matter of Example 59 includes, wherein a node agent executing at the compute node is used to monitor performance of the workload and modify the rules for resource allocation.

Example 61 is at least one machine-readable medium including instructions, which when executed by a machine, cause the machine to perform operations of any of the methods of Examples 41-60.

Example 62 is an apparatus comprising means for performing any of the methods of Examples 41-60.

Example 63 is an apparatus for implementing intent-based orchestration in heterogenous compute platforms, comprising: means for receiving, at an orchestration system, a workload request for a workload, the workload request including an intent-based service level objective (SLO); means for generating rules for resource allocation based on the workload request; means for generating a deployment plan using the rules for resource allocation and the intent-based SLO; means for deploying the workload using the deployment plan; means for monitoring performance of the workload using real-time telemetry; and means for modifying the rules for resource allocation and the deployment plan based on the real-time telemetry.

In Example 64, the subject matter of Example 63 includes, wherein the rules for resource allocation are generated based on lookup tables.

In Example 65, the subject matter of Example 64 includes, wherein the lookup tables match a type of workload to resources from a pool of resources.

In Example 66, the subject matter of Examples 63-65 includes, wherein the deployment plan includes a reservation of resources for the workload.

In Example 67, the subject matter of Examples 63-66 includes, wherein the deployment plan includes a predictive instantiation of resources for the workload.

In Example 68, the subject matter of Examples 63-67 includes, wherein the deployment plan is generated using a machine learning model.

In Example 69, the subject matter of Examples 63-68 includes, wherein the deployment plan is used to reconfigure hardware resources to service the workload request.

In Example 70, the subject matter of Example 69 includes, wherein to reconfigure hardware, the deployment plan is used to program a programmable hardware unit.

In Example 71, the subject matter of Example 70 includes, wherein the programmable hardware unit is a field-programmable gate array (FPGA).

In Example 72, the subject matter of Examples 63-71 includes, wherein the deployment plan includes a specification of a type of core to use.

In Example 73, the subject matter of Example 72 includes, wherein multiple different types of cores are disposed on the same die.

In Example 74, the subject matter of Examples 63-73 includes, wherein the deployment plan includes a specification of a node instance to use.

In Example 75, the subject matter of Example 74 includes, wherein the node instance is provided by an owner of the workload.

In Example 76, the subject matter of Example 75 includes, wherein the owner of the workload provides nodes that are permitted for the workload and nodes that are not permitted for the workload.

In Example 77, the subject matter of Examples 63-76 includes, wherein the deployment plan includes a security mechanism to isolate a workload container from other containers executing on a node, the workload container associated with the workload and the other containers not associated with the workload.

In Example 78, the subject matter of Example 77 includes, wherein the security mechanism includes dynamically assigned keys to encrypt container processing at the node.

In Example 79, the subject matter of Examples 63-78 includes, wherein the means for modifying the rules for resource allocation and the deployment plan, includes: means for profiling execution of the workload; and means for migrating a portion of the workload to a different compute node to improve compliance with the intent-based SLO.

In Example 80, the subject matter of Examples 63-79 includes, wherein to monitor performance of the workload, a pseudo-sidecar that is deployed with the workload and is executing on a compute node, is configured to collect and report the real-time telemetry.

In Example 81, the subject matter of Example 80 includes, wherein the pseudo-sidecar is one of a plurality of pseudo-sidecars deployed with corresponding containers that are configured to execute the workload.

In Example 82, the subject matter of Example 81 includes, wherein a node agent executing at the compute node is used to monitor performance of the workload and modify the rules for resource allocation.

Example 83 is at least one machine-readable medium including instructions that, when executed by processing circuitry, cause the processing circuitry to perform operations to implement of any of Examples 1-82.

Example 84 is an apparatus comprising means to implement of any of Examples 1-82.

Example 85 is a system to implement of any of Examples 1-82.

Example 86 is a method to implement of any of Examples 1-82.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An orchestration system for implementing intent-based orchestration in heterogenous compute platforms, comprising:
   a processor; and
   memory to store instructions, which when executed by the processor, cause the orchestration system to:
   receive, at the orchestration system, a workload request for a workload, the workload request including an intent-based service level objective (SLO);

generate rules for resource allocation based on the workload request;

generate a deployment plan using the rules for resource allocation and the intent-based SLO;

deploy the workload using the deployment plan;

monitor performance of the workload using real-time telemetry; and modify the rules for resource allocation and the deployment plan based on the real-time telemetry.

2. The orchestration system of claim 1, wherein the rules for resource allocation are generated based on lookup tables.

3. The orchestration system of claim 2, wherein the lookup tables match a type of workload to resources from a pool of resources.

4. The orchestration system of claim 1, wherein the deployment plan includes a reservation of resources for the workload.

5. The orchestration system of claim 1, wherein the deployment plan includes a predictive instantiation of resources for the workload.

6. The orchestration system of claim 1, wherein the deployment plan is generated using a machine learning model.

7. The orchestration system of claim 1, wherein the deployment plan is used to reconfigure hardware resources to service the workload request.

8. The orchestration system of claim 7, wherein to reconfigure hardware, the deployment plan is used to program a programmable hardware unit.

9. The orchestration system of claim 8, wherein the programmable hardware unit is a field-programmable gate array (FPGA).

10. The orchestration system of claim 1, wherein the deployment plan includes a specification of a type of core to use.

11. The orchestration system of claim 10, wherein multiple different types of cores are disposed on the same die.

12. The orchestration system of claim 1, wherein the deployment plan includes a specification of a node instance to use.

13. The orchestration system of claim 12, wherein the node instance is provided by an owner of the workload.

14. The orchestration system of claim 13, wherein the owner of the workload provides nodes that are permitted for the workload and nodes that are not permitted for the workload.

15. The orchestration system of claim 1, wherein the deployment plan includes a security mechanism to isolate a workload container from other containers executing on a node, the workload container associated with the workload and the other containers not associated with the workload.

16. The orchestration system of claim 15, wherein the security mechanism includes dynamically assigned keys to encrypt container processing at the node.

17. The orchestration system of claim 1, wherein to modify the rules for resource allocation and the deployment plan, the orchestration system is to:

profile execution of the workload; and migrate a portion of the workload to a different compute node to improve compliance with the intent-based SLO.

18. The orchestration system of claim 1, wherein to monitor performance of the workload, a pseudo-sidecar that is deployed with the workload and is executing on a compute node, is configured to collect and report the real-time telemetry.

19. The orchestration system of claim 18, wherein the pseudo-sidecar is one of a plurality of pseudo-sidecars deployed with corresponding containers that are configured to execute the workload.

20. The orchestration system of claim 19, wherein a node agent executing at the compute node is used to monitor performance of the workload and modify the rules for resource allocation.

21. At least one machine-readable medium including instructions for implementing intent-based orchestration in heterogenous compute platforms, which when executed by a machine, cause the machine to perform operations comprising:

receiving, at an orchestration system, a workload request for a workload, the workload request including an intent-based service level objective (SLO);

generating rules for resource allocation based on the workload request;

generating a deployment plan using the rules for resource allocation and the intent-based SLO;

deploying the workload using the deployment plan;

monitoring performance of the workload using real-time telemetry; and modifying the rules for resource allocation and the deployment plan based on the real-time telemetry.

22. The machine-readable medium of claim 21, wherein modifying the rules for resource allocation and the deployment plan, includes:

profiling execution of the workload; and migrating a portion of the workload to a different compute node to improve compliance with the intent-based SLO.

23. The machine-readable medium of claim 21, wherein to monitor performance of the workload, a pseudo-sidecar that is deployed with the workload and is executing on a compute node, is configured to collect and report the real-time telemetry.

24. The machine-readable medium of claim 23, wherein the pseudo-sidecar is one of a plurality of pseudo-sidecars deployed with corresponding containers that are configured to execute the workload.

25. The machine-readable medium of claim 24, wherein a node agent executing at the compute node is used to monitor performance of the workload and modify the rules for resource allocation.

* * * * *